US008521985B2

(12) United States Patent
Ohira et al.

(10) Patent No.: US 8,521,985 B2
(45) Date of Patent: *Aug. 27, 2013

(54) STORAGE SUBSYSTEM

(75) Inventors: Yoshinori Ohira, Yokohama (JP); Shoji Kodama, Sagamihara (JP); Kenta Shiga, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,204

(22) Filed: Aug. 7, 2012

(65) Prior Publication Data
US 2012/0303926 A1 Nov. 29, 2012

Related U.S. Application Data

(63) Continuation of application No. 12/050,301, filed on Mar. 18, 2008, now Pat. No. 8,245,007.

(30) Foreign Application Priority Data

Jan. 29, 2008 (JP) ................................. 2008-017014

(51) Int. Cl.
G06F 12/00 (2006.01)
G06F 13/00 (2006.01)
G06F 13/28 (2006.01)

(52) U.S. Cl.
USPC ........... 711/170; 711/206; 711/114; 711/203; 711/E12.002; 711/E12.059

(58) Field of Classification Search
USPC .................. 711/170, 206, 114, 203, E12.059, 711/E12.002
See application file for complete search history.

(56) References Cited

U.S. PATENT DOCUMENTS

2002/0059317 A1 5/2002 Black et al.
2005/0097274 A1 5/2005 Ohtani

FOREIGN PATENT DOCUMENTS

JP 2005-135116 5/2005
WO WO 02/19655 3/2002

OTHER PUBLICATIONS

Extended European Search Report in EP 08020090.0-1245/ 2085867, dated Dec. 12, 2011 (7 pgs).

*Primary Examiner* — Midys Rojas
(74) *Attorney, Agent, or Firm* — Antonelli, Terry, Stout & Kraus, LLP.

(57) ABSTRACT

There is provided a storage subsystem having a virtual volume and a page volume which has a page physical area allocated to the virtual volume. The storage subsystem divides an address space of the virtual volume into a plurality of pages, classifies each of the pages into one of a plurality of states including at least a first state and a second state, and further divide a page which is classified into the second state into a plurality of segments to managed the page classified into the second state. The first state is a state in which a page physical area is allocated to the page from the page volume, and the write data is stored in the page physical area. The second state is a state in which the predetermined pattern data and the segment are managed, in the memory, by correlating with each other.

12 Claims, 24 Drawing Sheets

POOL MANAGEMENT TABLE

SPECIFIC PATTERN MANAGEMENT TABLE

THRESHOLD VALUE MANAGEMENT TABLE

| VIRTUAL VOLUME # | THRESHOLD VALUE α | THRESHOLD VALUE β | THRESHOLD VALUE γ |
|---|---|---|---|
| 1 | 5 | 2 | 5 |
| 2 | 10 | 3 | 6 |
| ⋮ | ⋮ | ⋮ | ⋮ |

THRESHOLD VALUE MANAGEMENT TABLE

STORAGE SUBSYSTEM

CROSS-REFERENCE TO RELATED APPLICATION

This application is a continuation of U.S. application Ser. No. 12/050,301, filed Mar. 18, 2008 (now U.S. Pat. No. 8,245,007) and which application claims priority from Japanese patent application JP 2008-17014 filed on Jan. 29, 2008, the contents of which are hereby incorporated by reference into this application.

BACKGROUND

This invention relates to a storage subsystem which includes a plurality of disk devices, and more particularly, to a technology of effectively using storage areas of the storage subsystem.

An example of a storage system used for a computer system is a disk array system (hereinafter, also referred to as storage subsystem) which includes a plurality of disk devices. The disk array system operates the plurality of disk devices in parallel to realize a higher speed as compared with a storage system which uses a single disk device.

A virtual volume technology has been available to efficiently use a disk capacity in the disk array system. This technology sets virtual storage areas in a computer beforehand, and allocates a physical storage area only to an area for which a write request is made among the virtual storage areas.

Another technology available to efficiently use the disk capacity is a de-duplication technology. This technology stores, when data identical to data requested to be written has been stored in the storage subsystem before reception of the write request, only a information indicating that the data is identical to the data which has been stored, but does not store the data itself requested to be written in the storage subsystem.

The de-duplication technologies are classified into a technology which executes de-duplication control for all data stored in the storage subsystem, and a technology which executes de-duplication control only for specific data registered beforehand. The former can increase a reduction effect of a storage capacity needed to store data (hereinafter, referred to as capacity reduction effect). However, processing time becomes longer, and the amount of management information increases. On the other hand, the latter can reduce management information. However, a capacity reduction effect is limited.

JP 2005-135116 A discloses a technology described below. There is provided a storage system configuring a logical storage device by dividing an area on a physical storage space formed by a group of a plurality of physical storage devices by the unit of physical block having a certain block length and by assigning the physical storage space in every physical block. This storage system includes a logical storage control table which records identification information indicating whether a physical block is assigned to data or operation is bound to data created from a predetermined data arrangement pattern in every area on the logical storage device, and a data writing unit which, upon reception of a request of writing data into an area of the logical storage device, when a data arrangement pattern of the write request matches a previously registered data arrangement pattern, records the identification information of the same data arrangement pattern into the logical storage control table correspondingly to the write request area and abandons the write request data.

SUMMARY

The storage system of JP 2005-135116 A uses both of a virtual volume technology and a de-duplication technology. Management sizes of a virtual volume and de-duplication are equal to each other. When both management sizes are reduced to increase capacity reduction effects of the virtual volume technology and the de-duplication technology, the amount of management information increases. When all pieces of management information are to be stored in a storage medium such as a cache which allows high-speed access, the system will be more costly. On the other hand, when management sizes are increased, capacity reduction effects are lowered while the amount of management information decreases. In other words, there is a trade-off relation between the amount of management information and the capacity reduction effect. Thus, there are demands for a technology which efficiently uses a storage capacity of the storage subsystem while suppressing the amount of management information for the virtual volume technology and the de-duplication technology.

This invention provides a storage subsystem including: a processor; a memory; a virtual volume; and a page volume which includes a plurality of storage media, and has a page physical area allocated to the virtual volume. The processor divides an address space of the virtual volume into a plurality of pages, and classifies each of the plurality of pages into one of a plurality of states including at least a first state and a second state to be managed. The processor further divides a page classified into the second state into a plurality of segments to be managed. In this case, the first state represents a state where, as a result of receiving a request of writing write data in the page, a page physical area is allocated to a page from the page volume, and the write data is stored in the page physical area. Further, the second state represents a state where, as a result of receiving a request of writing write data matched with predetermined specific pattern data in a segment of the page, the specific pattern data and the segment are correlated with each other in the memory to be managed.

The storage capacity of the storage subsystem can be efficiently used while suppressing the amount of management information for the volume virtualization technology and the de-duplication technology.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Exemplary embodiments of this invention will be described below. It should be noted that, however, this invention is not limited only to the embodiments as described below.

Figure 1:
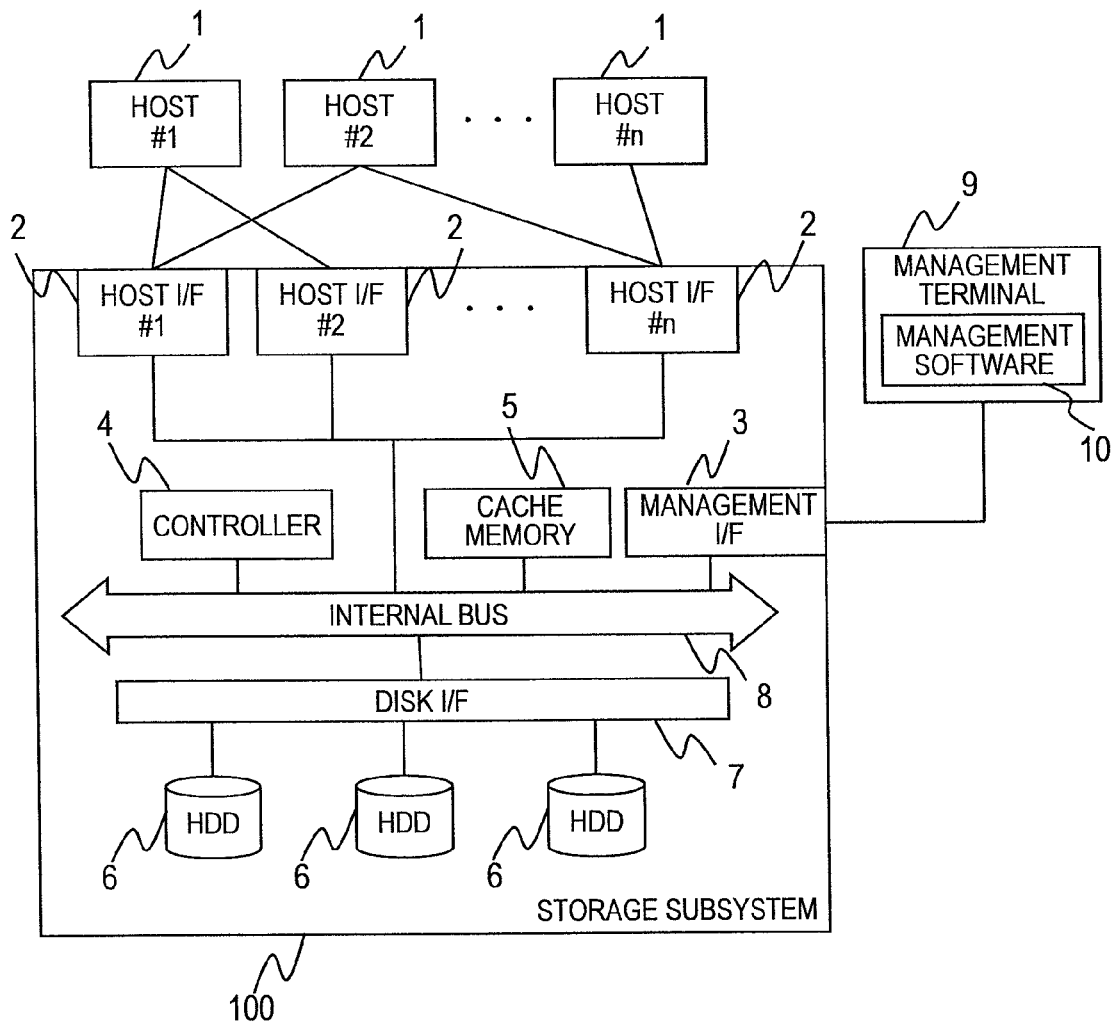
FIG. 1 illustrates an example of a hardware configuration of storage subsystem according to each of first, second, and fifth embodiments of this invention.

FIG. 1 illustrates an example of a hardware configuration of a storage system to which this invention is applied. The storage system includes a storage subsystem 100 and a host computer (host) 1. The storage subsystem 100 and the host 1 are coupled via a host interface (host I/F) 2. The storage subsystem 100 includes the host interface 2, a management interface (management I/F) 3, a controller 4 including a memory and a CPU, a cache memory 5, a disk interface (disk I/F) 7, and a plurality of hard disks (HDD's) 6. The components excluding the HDD are coupled via an internal bus 8. Configuration management of the storage subsystem 100 is carried out by management software 10 operated in a management terminal 9. The management terminal 9 and the storage subsystem 100 are coupled via the management interface 3.

Though not shown, each of the management terminal 9 and the host 1 is a general computer which includes a communication I/F for communicating with the CPU, the memory, or the storage subsystem 100. The management software 10 is stored in a memory of the management terminal 9 to be executed by a CPU of the management terminal 9.

Figure 2:
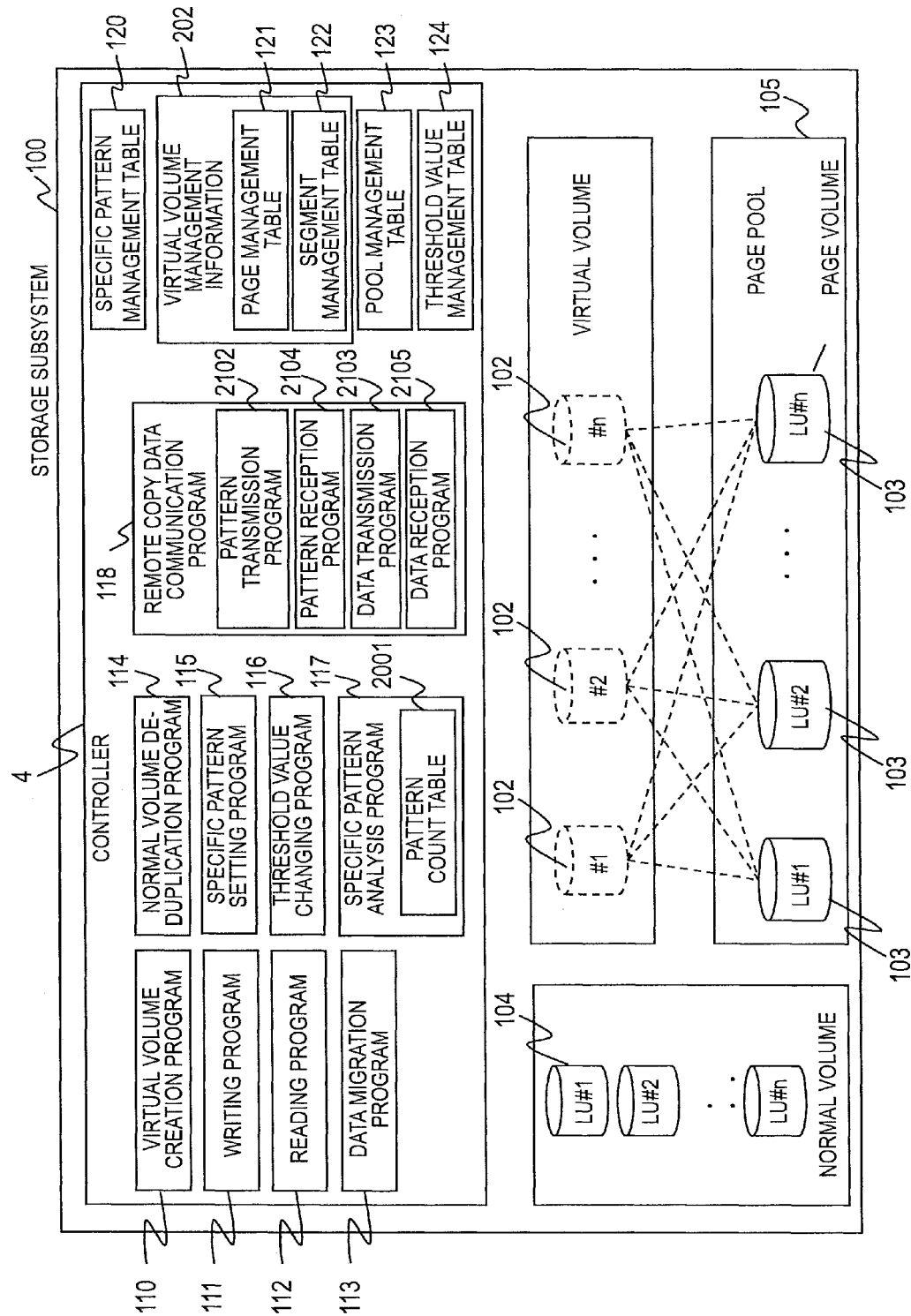
FIG. 2 illustrates an example of a logical system configuration of the storage subsystem.

FIG. 2 illustrates an example of a logical system configuration of the storage subsystem 100.

Various programs and various tables will be described below in detail. The programs and the tables are stored in a memory of the controller 4 shown in FIG. 1, and executed by a CPU of the controller 4. Programs 113, 114, 117 and 118 will be described in detail in a second embodiment of this invention and after because they are not used in the first embodiment of this invention.

The storage subsystem 100 includes a plurality of normal volumes 104. Each normal volume 104 is a storage area configured in an HDD group such as a RAID group which includes a plurality of HDD's 6, and recognized as one logical storage area by the host 1 and the management terminal 9.

The storage subsystem 100 includes a plurality of virtual volumes. Each virtual volume 102 has the same address space as an address of the normal volume 104. The virtual volume 102 is recognized as one logical storage area by the host 1 as in the case of the normal volume 104. Data is written in or read from the virtual volume 102 as in the case of the normal volume 104. A difference between the virtual volume 102 and the normal volume 104 is that a physical area is allocated to the normal volume 104 upon writing of data while a physical area is allocated to the virtual volume 102 before writing of data. When the virtual volume 102 is used, no physical area needs to be allocated if there is no writing. Accordingly, physical areas to be mounted in the storage system can be reduced, enabling effective use of a storage capacity. The physical area allocated to the virtual volume is secured from a page pool 105. The page pool 105 contains a plurality of page volumes 103. As in the case of the normal volume 104, the page pool 103 is a storage area configured in an HDD group such as RAID group which includes a plurality of HDD's 6. Thus, a physical volume on the page volume 103 belonging to the page pool 105 is allocated to the virtual volume.

Figure 3:
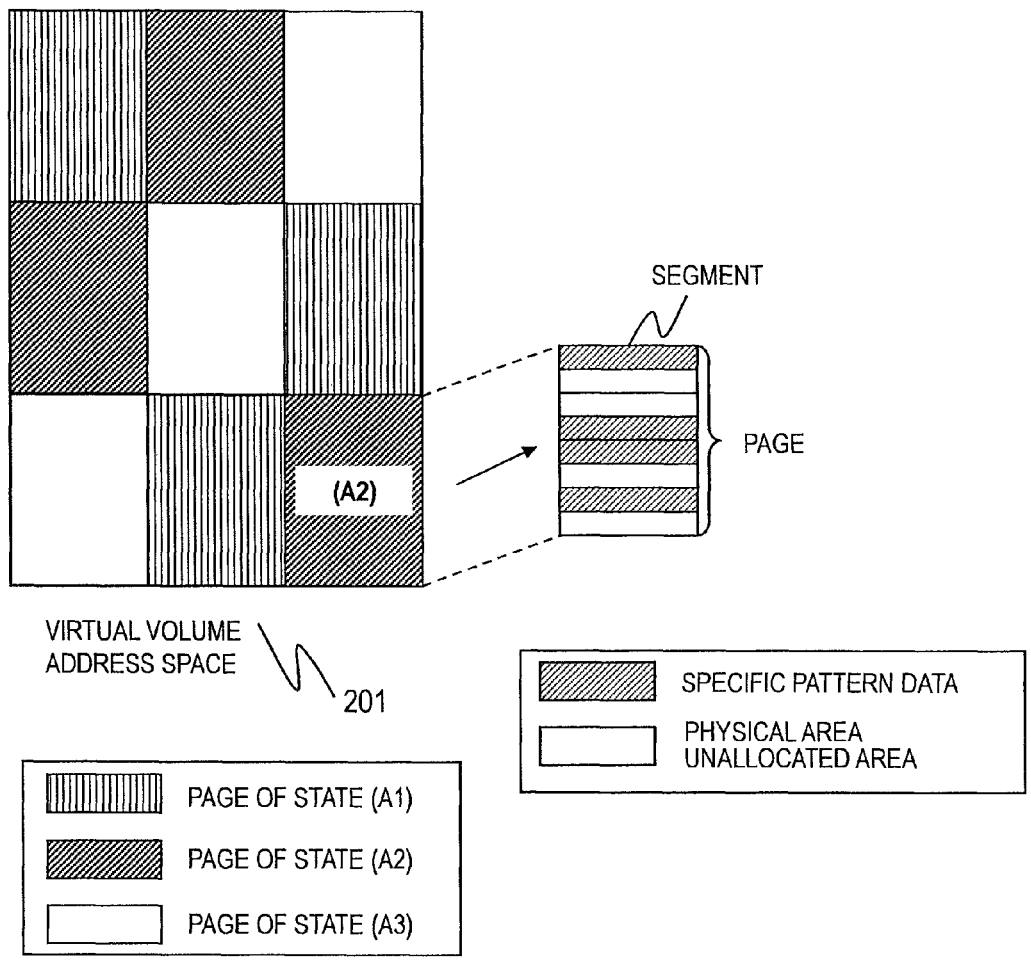
FIG. 3 illustrates an example of an address space of a virtual volume.

FIG. 3 illustrates an example of an address space of the virtual volume 102. The address space of the virtual volume 102 is divided into a plurality of pages to be managed. In order to facilitate page management, a page size is normally fixed. Three states A1 to A3 are present in a page of an address space 201 of the virtual volume, and management is carried out according to each state. A page of the state A2 is divided into a plurality of segments to be managed. In FIG. 3, the page is divided into eight segments. However, the page can be divided into any number as long as the number is two or more. In order to facilitate segment management, a segment size is normally fixed.

The states A1 to A3 will be described below in detail. In the case of the state A1, a write request is issued from the host 1 into the page and, as a result, a physical area is allocated to the page.

In the case of the state A2, a write request is issued from the host 1 into the page, and write data matches data of a specific pattern managed by the storage subsystem 100. Thus, only a information that the data is specific pattern data is recorded as management information in a segment management table 122, and no physical area is allocated to the page. In other words, in the page of this state, storage capacity has been reduced by the above-mentioned de-duplication technology. The page in the state A2 is managed by segments because, when the de-duplication control is carried out as described above, a reduction effect of the storage capacity provided by de-duplication is higher as management units are smaller. In other words, in the case of the page subjected to de-duplication control (page in the state A2), a segment of a smaller size is used as a management unit to heighten the reduction effect of the storage capacity in the storage subsystem. In the case of the pages not subjected to de-duplication control (pages of the states A1 and A3 described below), management is carried out not by segments but by pages to prevent increases in management information and processing loads.

In the case of the state A3, because no write request has been issued from the host 1 into the page, no physical area has been allocated. In the page of this state, a storage capacity is reduced by the virtual volume technology.

As described above, according to whether a write request has been received from the host, and whether write data contained in a write request matches data of a specific pattern if the wiring request has been received, the pages of the address space of the virtual volume 102 are classified into the states A1 to A3. As a result, a capacity reduction effect can be heightened while suppressing the amount of management information.

Figure 4:
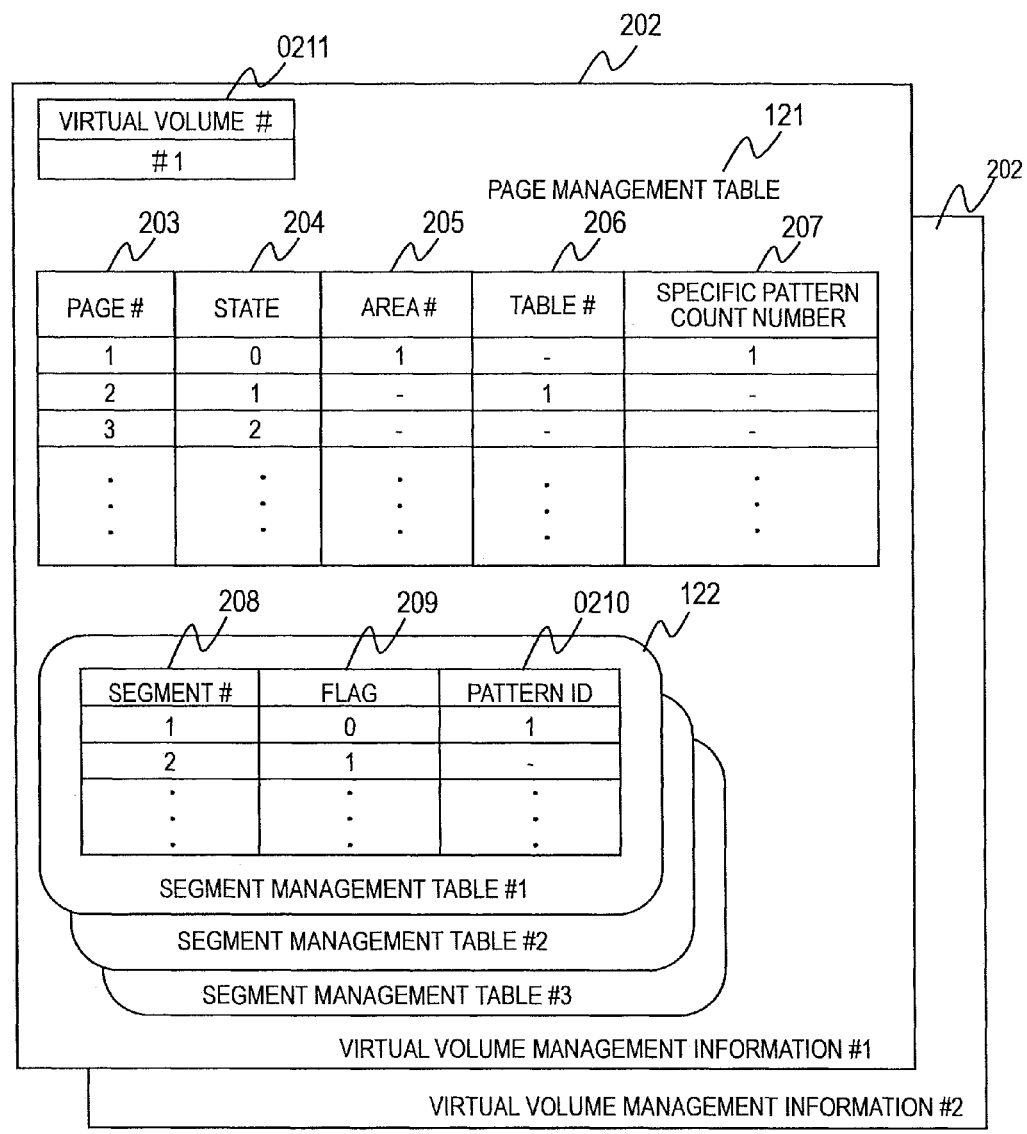
FIG. 4 illustrates an example of virtual volume management information.

FIG. 4 illustrates an example of virtual volume management information 202 used for managing an address space of the virtual volume 201. The virtual volume management information 202 is created for each virtual volume 102 during creation of the virtual volume 102. Each virtual volume management information 202 contains a section of a virtual volume number (virtual volume #) 211 for identifying a virtual volume, and one page management table 121, and when pages of states A2 are present in the virtual volume identified by the virtual volume #211, contains the number of segment management tables 122 equal to the number of pages of state A2.

The page management table 121 is a table for managing a state of each page in the address space of the virtual volume 201. The segment management table 122 is a table for managing a segment in the page of the state A2, and the number of segment management tables 122 equal to the number of pages of states A2 is created.

First, the page management table 121 will be described. In a page number (page #) 203 of the page management table 121, a page number that the virtual volume 102 has is recorded. In a state section 204, a state of the page is recorded. According to this embodiment, values corresponding to the states A1, A2, and A3 are set to "0", "1", and "2", respectively. In an area number (area #) section 205, information indicating which of physical areas of the page pool 105 has been allocated to the page is recorded. Accordingly, if the state 204 is "0", in other words, if a state of the page is A1, an identification number indicating a physical area allocated to the page is recorded in the area #205. If the state 204 is "1" or "2", in other words, if a state of the page is A2 or A3, null is recorded in the area #205 because no physical area has been allocated to the page. The physical area of the page pool 105 is managed by a pool management table 123 described below. In a table number (table #) 206, an identification number indicating the segment management table 122 for managing the segment of the page is recorded. Accordingly, if the state 204 is 1, in other words, if a state of the page is A2, an identification number of a segment management table 122 corresponding to the page is recorded in the table #206. In other cases (state of the page is A1 or A3), no segment management table 122 is present because the page is not managed by segments, and thus null is recorded in the table #206. In a specific pattern count number section 207, a number indicating the number of matching times of write data with specific pattern data managed by the storage subsystem among write requests in the page is recorded. In the specific pattern count number 207, data is recorded for a page of a state A1, while a null value is recorded for a page of a state A2 or A3. If a state of the page is A2, all write data written in the page should match the specific pattern data. If a state of the page is A3, because no write request has been received from the host, it is not necessary to count the number of data items matched with the specific pattern.

The segment management table 122 will be described. In a segment number section (segment #) 208 of the segment management table 122, an identification number added to each segment present in one page is recorded. Each segment can take one of two states: a state where a information indicating that specific pattern data has been written upon reception of a write request from the host to write the specific pattern data has been recorded; and a state where no write request has been received from the host. In a flag section 209, a value for identifying a state of the segment is recorded. According to this embodiment, a state where a information indicating that the specific pattern data has been written has been recorded is set to "0", and a state where no write request in the segment has been received is set to 1. In pattern ID 210, an identification number indicating a pattern of data requested to be written in the segment from the host is recorded. Accordingly, only when the flag 209 is "0", ID for identifying a specific data pattern is recorded in the pattern ID 210. When the flag 209 is 1, "null" is recorded in the pattern ID 210. A specific pattern data management table 120 used for identifying whether write data requested to be written from the host is specific pattern data will be described below.

Figure 5:
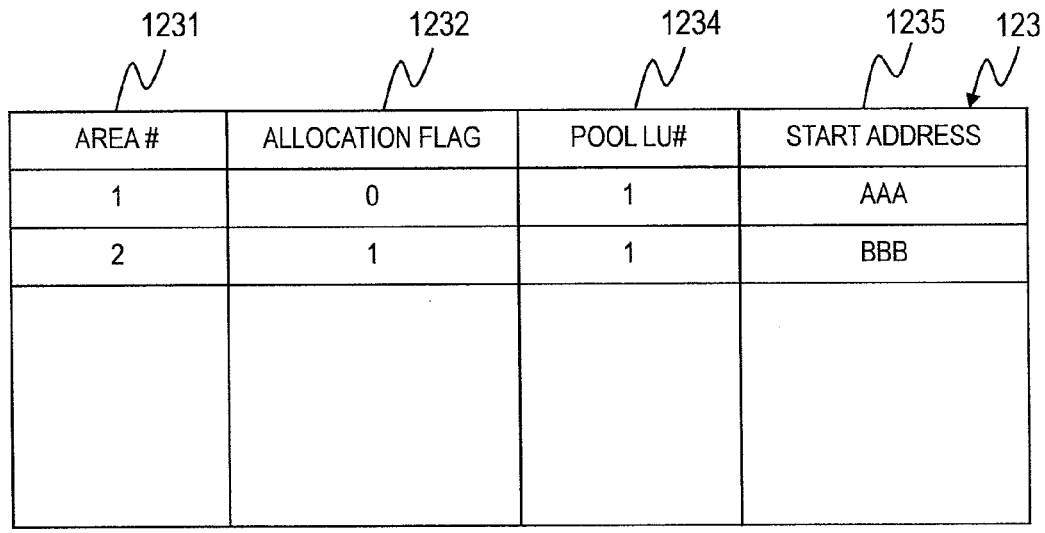
FIG. 5 illustrates an example a pool management table.

FIG. 5 illustrates an example of a pool management table 123 for managing storage areas (physical areas) of the page pool 105. In an area number (area #) 1231, an identification number of a physical area included in the page pool 105 is recorded. This area # is referred to from the area #205 of the page management table 121. In an allocation flag 1232, a flag indicating whether the physical area has been allocated to the virtual volume 102 is recorded. According to this embodiment, "0" is recorded if the area is yet to be allocated, while "1" is recorded if the area has been allocated. In a pool LU number (pool LU#) section 1234, an identification number of a page volume 103 to which the physical area indicated by the area #1231 belongs is recorded. In a start address section 1235, a start address for specifying a position of the physical area in the page volume 103 is recorded. In other words, each physical area of the page pool 105 corresponds to a storage area of a size equal to a page size from the start address 1235 in the page volume 103 identified by the pool LU#1234.

Figure 6:
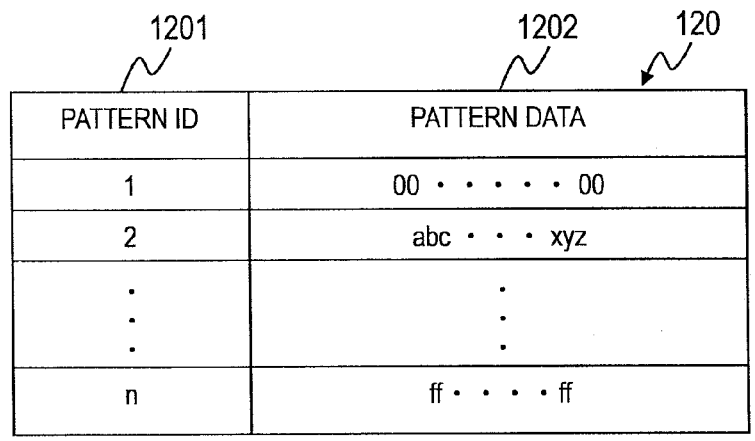
FIG. 6 illustrates an example of a specific pattern management table.

FIG. 6 illustrates an example of a specific pattern management table 120 for managing specific pattern data, which is used for judging whether write data requested to be written in the virtual volume 102 is specific pattern data. In the specific pattern management table 120, ID for identifying specific pattern data is recorded in pattern ID 1201, and data of the specific pattern is recorded in a column of pattern data 1202. A data size of specific pattern to be recorded is equal to a segment size.

Figures 7, 8:
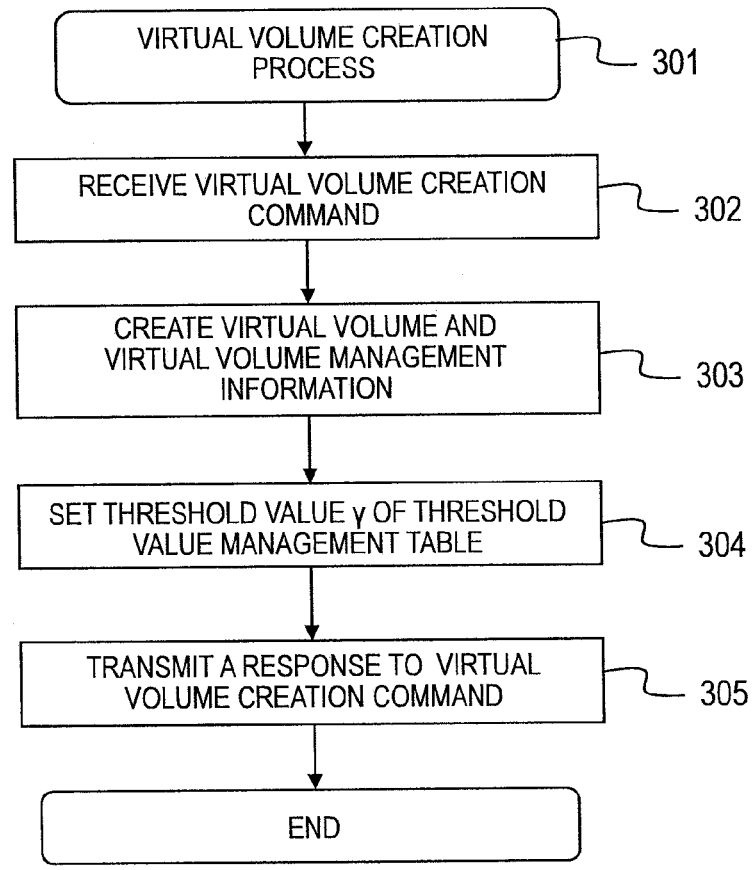
FIG. 7 illustrates an example of a threshold value management table.
FIG. 8 illustrates an example of a processing flow of a virtual volume creation program.

FIG. 7 illustrates an example of a threshold value management table 124 for managing a threshold value used for judging whether to change a state of a page from A1 to A2. A process of changing the page state from A1 to A2 will be described below referring to FIG. 13. In a threshold value management table 124, a virtual volume number for identifying a virtual volume 102 is recorded in a virtual volume #1241, and a threshold value γ 1242 of a specific pattern count number is recorded for each virtual volume. A user can designate a threshold value γ for each virtual volume 102 by management software 10. When the specific pattern count number 207 managed in the page management table 121 reaches the threshold value γ, data actually written in the page of a state A1 are checked. When the data are all recognized to be specific pattern data, the state of the page is changed from A1 to A2.

FIG. 8 illustrates an example of a processing flow 301 of the virtual volume creation program 110. First, a user instructs the virtual volume creation program 110 of the storage subsystem 0 to create a virtual volume 102 by the management software 10. The virtual volume creation program 110 receives a virtual volume creation command from the management software 10 (Step 302) to create a virtual volume 102, and also creates virtual volume management information 202 (Step 303). In other words, the virtual volume creation program 110 allocates an identification number to the created virtual volume to record the identification number in a virtual volume #211 of the virtual volume management information 202. In this case, for pages in the created virtual volume 102, no write request has been received from the host. Accordingly, 2 indicating A3 for all the pages is recorded in the state 204 of the page management table 121 created for the virtual volume, while null values are recorded in the area #205, the table 206, and the specific pattern count number 207. No segment management table 122 is created. The virtual volume creation program 110 records a number for identifying the created virtual volume 102 in the virtual volume #1241 of the threshold value management table 124, and a threshold value which the user has optionally designated by the management software 10 in the threshold value γ 1242 (Step 304). Then, the virtual volume creation program 110 returns an end of virtual volume creation to the management software 10 (Step 305) to finish the process.

Figure 9:
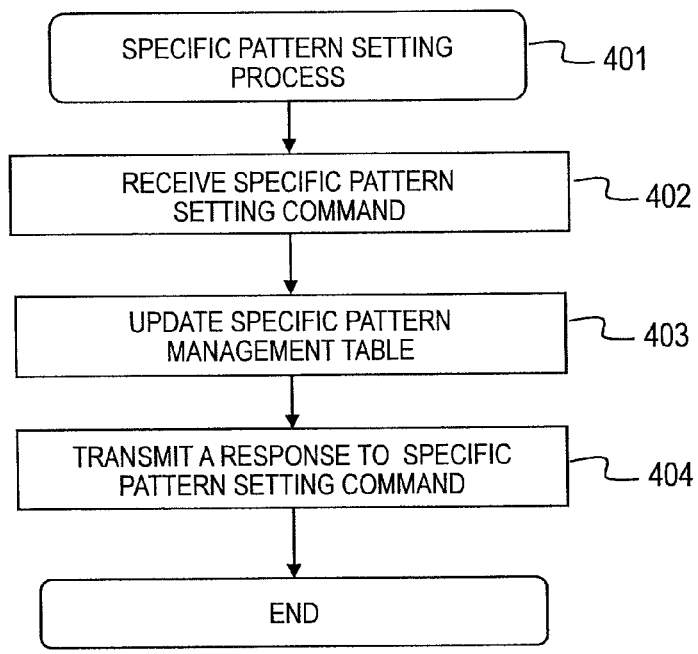
FIG. 9 illustrates an example of a processing flow of a specific pattern setting program.

FIG. 9 illustrates an example of a processing flow 401 of the specific pattern setting program 115. The user designates data to be added (or deleted) as a specific pattern by the management software 10, and instructs the specific pattern setting program 115 to add (or delete) specific pattern data to the specific pattern management table 120. The specific pattern setting program 115 receives a specific pattern data setting command from the management software 10 (Step 402). If the setting command instructs addition of new data as specific pattern data, the specific pattern setting program 115 allocates ID to data designated by the command, and records the designated data with the ID in the specific pattern management table 120 (Step 403).

If the setting command instructs deletion of specific pattern data from the specific pattern management table 120, the specific pattern setting program 115 identifies specific pattern data of a deletion target from ID designated by the setting command, and deletes the identified specific pattern data with the ID from the specific pattern management table 120 (Step 403).

Upon completion of updating of the specific pattern management table, the specific pattern setting program 115 returns an end of setting to the management software 10 (Step 404) to finish the process.

Figure 10:
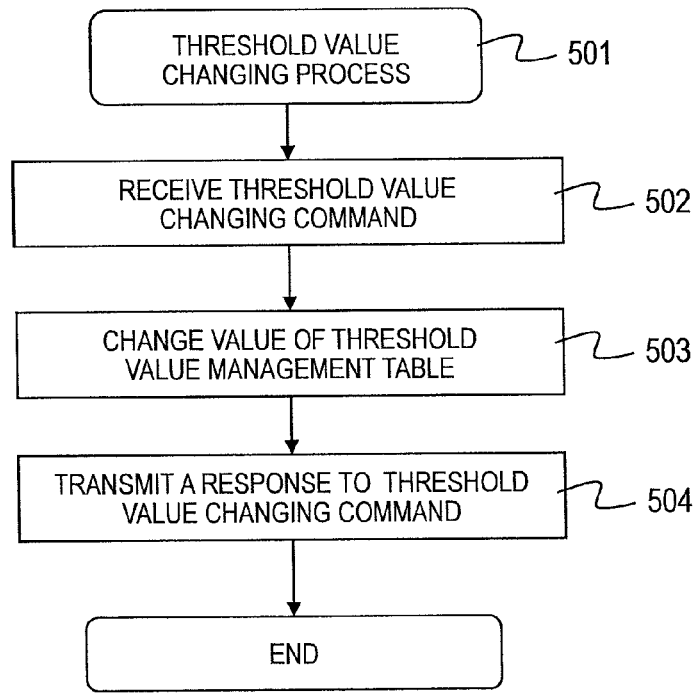
FIG. 10 illustrates an example of a processing flow of a threshold value changing program.

FIG. 10 illustrates an example of a processing flow 116 of the threshold value changing program 116 for changing a threshold value γ, which is used for judging whether to change a state of a page from A1 to A2. The user designates a number for identifying a virtual volume whose threshold value is to be changed and a threshold value after the change by the management software 10. The management software 10 instructs the threshold value changing program 116 to change a threshold value γ 1242 of the threshold value management table 124. The threshold value changing program 116 receives a threshold value changing command from the management software 10 (Step 502) to change a threshold value of a virtual volume designated in the threshold value management table 124 to a designated value (Step 503). Upon completion of the threshold value changing, the threshold value changing program 116 returns an end of threshold value changing to the management software 10 (Step 504).

Figure 11:
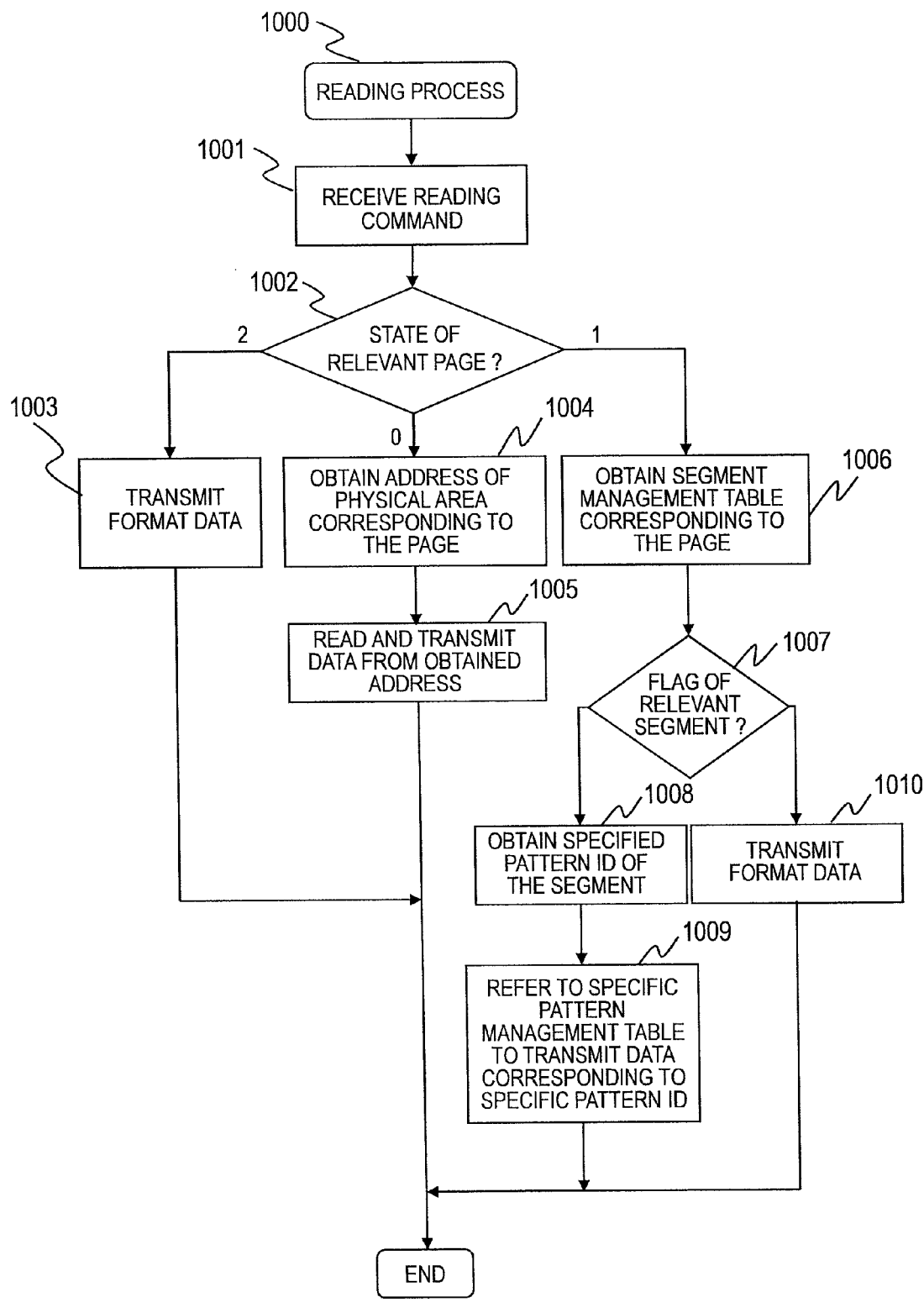
FIG. 11 illustrates an example of a processing flow of a reading program.

FIG. 11 illustrates an example of a processing flow 1001 of the reading program 112. Upon reception of a reading request in the virtual volume 102 from the host 1 (Step 1001), the reading program 112 refers to the page management table 121 of the designated virtual volume to check a state 204 of a page corresponding to a reading requested address (Step 1002). The reading request contains a virtual volume number for designating a virtual volume of a reading target and address information of a reading target area of the virtual volume. Because each page of the virtual volume has a predetermined size, a page of a reading target can be specified from the address information contained in the reading request and the size of each page.

In the case of the page state A1, a physical area has been allocated to the page. Accordingly, the reading program 112 refers to the area #205 of the page management table 121 to specify an identification number of the physical area corresponding to the page. Further, referring to the pool management table 123 based on the specified identification number of the physical area, the reading program 112 obtains a number 1234 of a reading target page volume 103 and a start address 1235 of a reading target area of the page volume 103 (Step 1004). Then, the reading program 112 reads data of a reading target from a physical area designated by the obtained page volume number and the address to transmit the read data to the host 1 (Step 1005).

In the case of the page state A2, the page is divided into segments to be managed. Accordingly, the reading program 112 refers to the table #206 of the page management table 121 for the designated virtual volume 102 to obtain a segment management table 122 corresponding to the page (Step 1006). Then, the reading program 112 refers to the obtained segment management table 122 to check a flag 209 of a segment of a reading target (Step 1007). Because the segment of the page has a predetermined size, a page of a reading target can be specified from the address information contained in the reading request and a size of each segment.

If the flag is "0", because data of a specific pattern has been allocated to the segment, the reading program 112 refers to the pattern ID 210 to obtain data identified by the ID from the specific pattern management table 120, and transmits the obtained data to the host 1 (Step 1009). On the other hand, if the flag 209 is 1, because no data has been written in the segment, the reading program 112 transmits predetermined format data to the host 1 (Step 1010). In a general storage subsystem, format data is set to 0 in many cases, but this invention is not limited thereto. The user can designate format data for each virtual volume.

In the case of the page state A3, no data has been written in the page. Accordingly, the reading program 112 transmits format data to the host 1 as in the case of Step 1010 (Step 1003).

Figure 12:
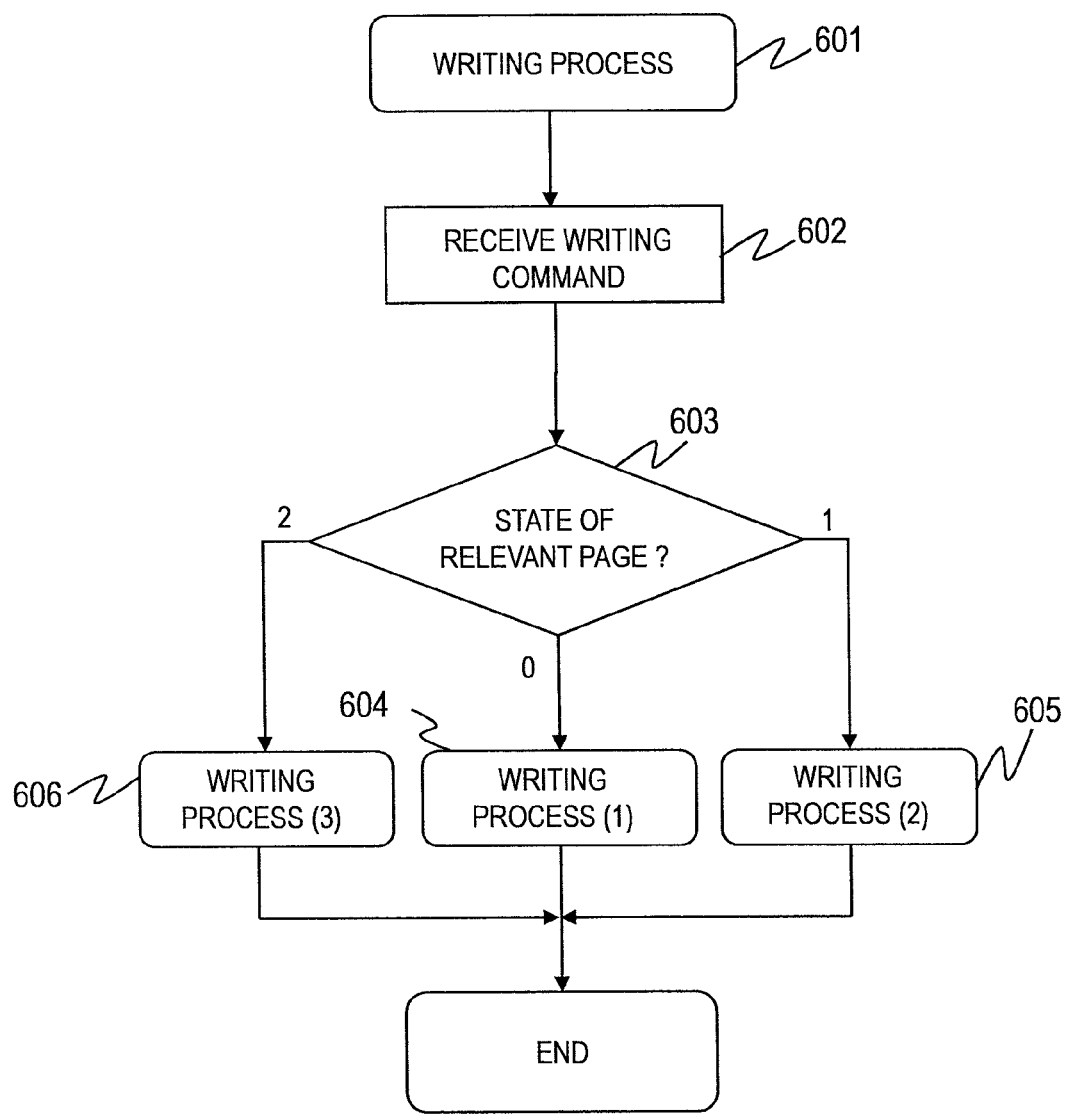
FIG. 12 illustrates an example of a processing flow of a writing program.

FIG. 12 illustrates an example of a processing flow 601 of the writing program 111. Upon reception of a write request in the virtual volume 102 from the host 1, the writing program 111 refers to the page management table 121 for the designated virtual volume to check a state 204 of a page corresponding to a write requested address (Step 1002). A method of designating a page of a writing target is similar to the method of the reading process.

The writing program 111 carries out writing processes 1 to 3 (Steps 604 to 605) for page states A1 to A3, respectively. The writing processes 1 to 3 will be described below in detail referring to FIGS. 13 to 15.

Figure 13:
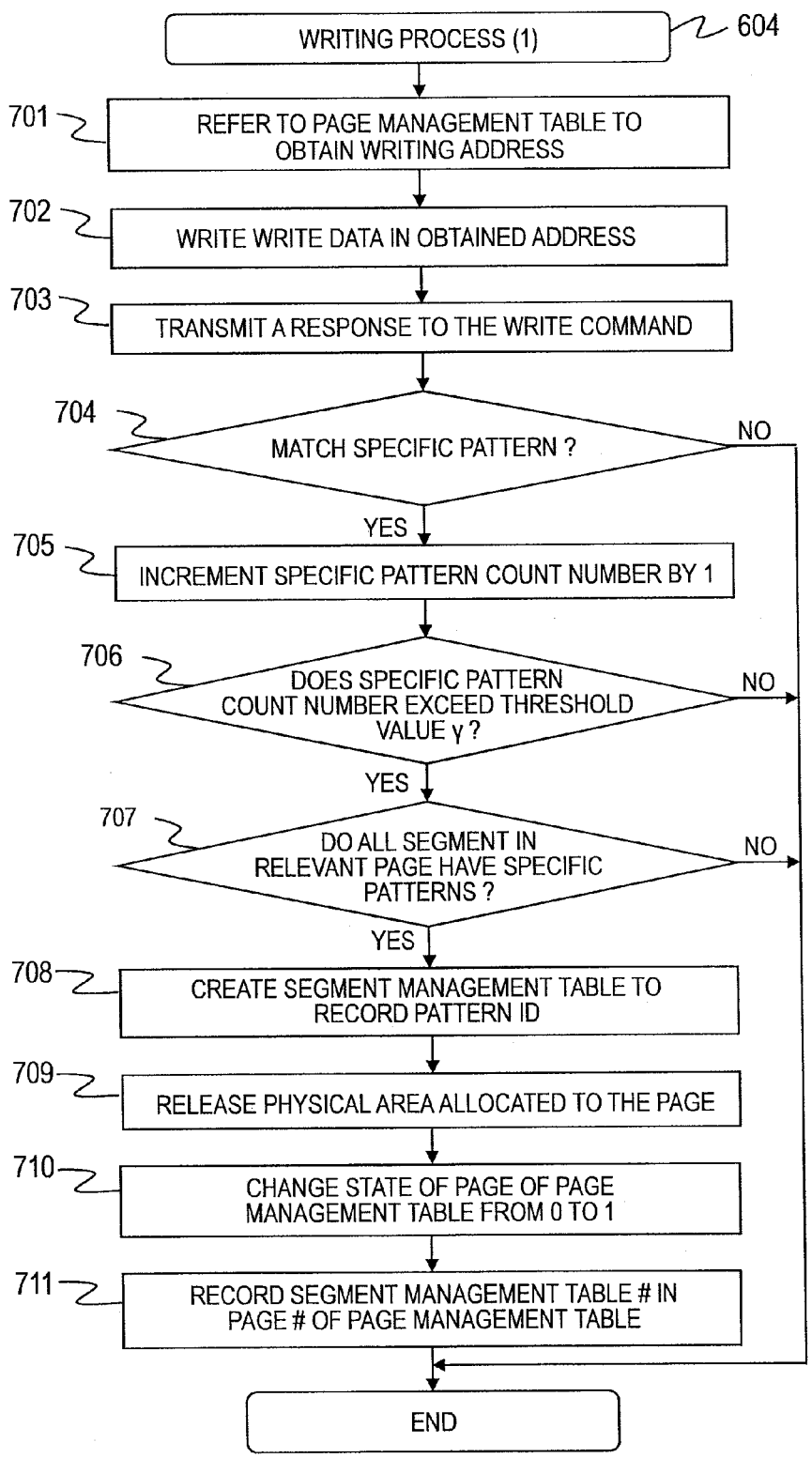
FIG. 13 illustrates an example of a processing flow of a writing process 1.

FIG. 13 illustrates an example of the writing process 1 (Step 604) executed if a state of a page of a writing target is A1 when the writing program 111 receives a write request. The writing program 111 refers to the page management table 121 for a virtual volume of a writing target to specify an area #205 of a physical area allocated to the writing target page. The writing program 111 obtains a pool LU #1234 and a start address 1235 of the specified physical area from the pool management table 123 (Step 701). The writing program 111 writes write data in the physical area designated by the obtained pool LU #1234 and the start address 1235 (Step 702) to transmit a response to the write command to the host 1 (Step 703).

Subsequently, the writing program 111 refers to the specific pattern management table 120 to judge whether the write data requested to be written matches any one of specific pattern data (Step 704). If the write data matches no specific pattern data 1202, the writing process is finished. If the write data matches the specific pattern data 1202, proceeding to Step 705, the writing program 111 refers to the page management table 121 to add 1 to a specific pattern count number 207 of a write requested page.

Proceeding to Step 706 after Step 705, the writing program 111 refers to the threshold value management table 124 to specify a threshold value γ 1242 corresponding to the virtual volume of the writing target, and judges whether the specific pattern count number 207 added "1" in Step 705 exceeds the threshold value. If the specific pattern count number 207 does not exceed the threshold value, the writing process is finished. If the specific pattern count number exceeds the threshold value, proceeding to Step 707, the writing program 111 judges whether data written in the page all match the specific pattern data. If any one of the data written in the page does not match the specific pattern data, the writing process is finished. If all the data written in the page match the specific pattern data, proceeding to Step 708, the writing program 111 creates a new segment table 122 for the writing target page. In this case, because all the data match the specific pattern data for the page, "0" is set in all the flags 209 of the segment table 122. The writing program 111 refers to the specific pattern management table 120 to specify ID for identifying specific pattern data stored in each segment of the page, and records the ID in the pattern ID 210 (Step 708). Then, the physical area of the page pool 105 allocated to the writing target page is released (Step 709). Through Steps 708 and 709, a state of the writing target page has been changed from A1 to A2. Accordingly, the writing program 111 changes the state 204 corresponding to the page of the page management table 121 from "0" to "1" (Step 710). A number for identifying the segment management table 122 newly created in Step 708 is recorded in the table #206 of the page management table 121 (Step 711).

According to the writing process 1, even in the case of pages to which physical areas have been allocated, for a page including only specific pattern data, the allocated physical area is released, and only management information indicating which specific pattern data has been written from the host is recorded. Thus, a capacity reduction effect can be heightened.

Figure 14:
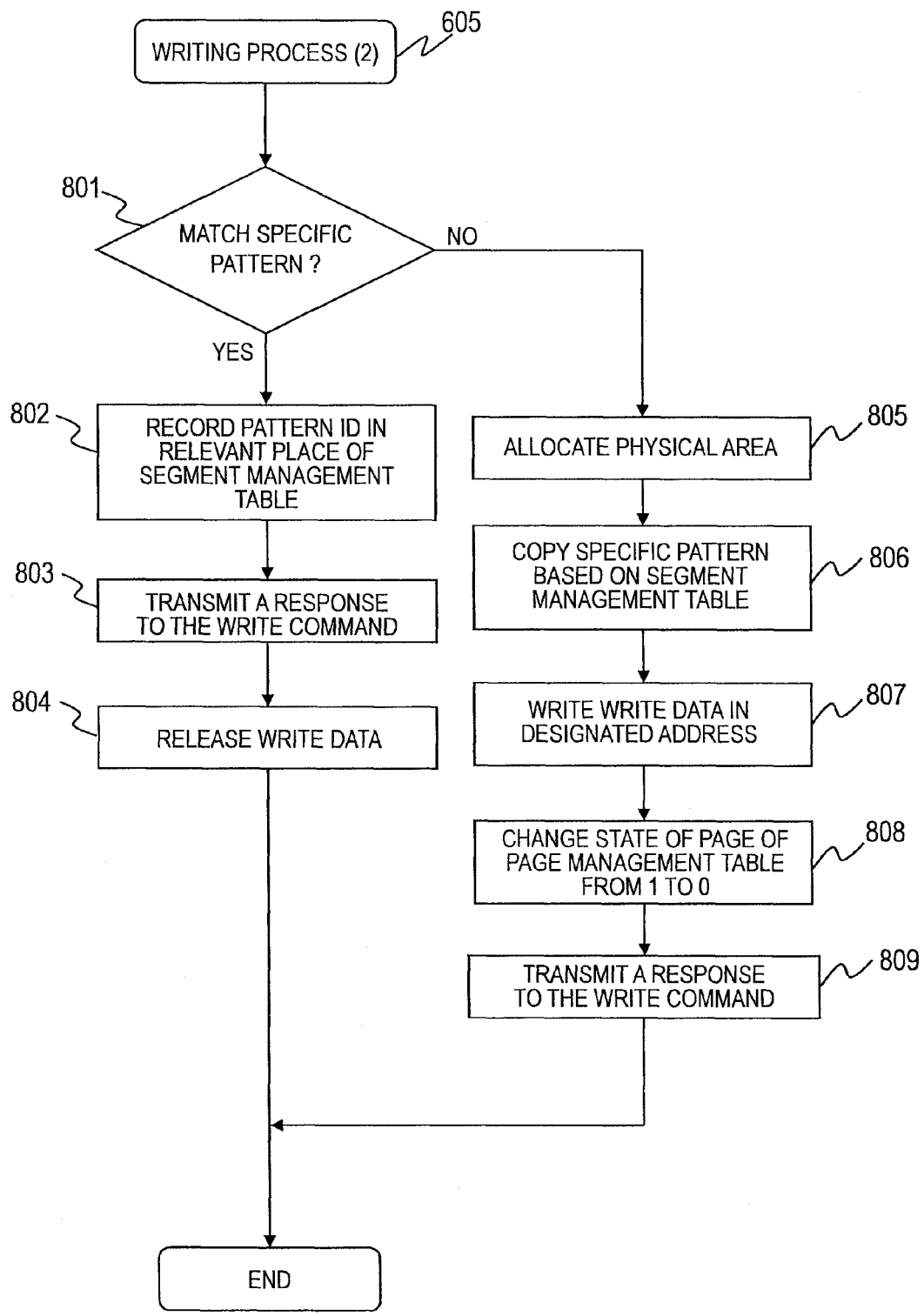
FIG. 14 illustrates an example of a processing flow of a writing process 2.

FIG. 14 illustrates an example of the writing process 2 (Step 605) executed by the writing program 111 when a state of a writing target page is A2. The writing program 111 refers to the specific pattern management table 120 to judge whether pattern data 1202 include data matched with write data requested to be written (Step 801).

If matched specific pattern data is judged to be present in Step 801, proceeding to Step 802, the writing program 111 specifies ID for identifying the specific pattern data matched with the write data from the pattern ID 1201 of the specific pattern management table 120. The writing program 111 refers to the segment management table 122 of the writing target page to record the specified ID of the pattern data in the pattern ID 210 of a segment of a writing target (Step 802). The writing target segment can be specified by a method similar to the method of the reading target segment. Then, the writing program 111 transmits a response to the write command to the host 1 (Step 803), and releases the write data (Step 804) to finish the writing process.

If the write data is judged not to match the specific pattern data in Step 801, proceeding to Step 805, the writing program 111 refers to the pool management table 123 to allocate a physical area from the page pool 105 to the writing target page. The writing program 111 secures an area where an allocation flag 1232 indicating an unallocated physical area is "0" (Step 805). In other words, the writing program 111 changes the flag 1232 of the unallocated physical area to 1, and records an identification number of the physical area secured as the area #205 in the page management table 121 of the writing target page of the writing target virtual volume.

In the physical area secured in Step 805, the writing program 111 stores specific pattern data originally allocated to the writing target page (in other words, only a information indicating that specific pattern has been written without storing data in a real physical area upon reception of a write request from the host is managed) (Step 806). In other words, the writing program 111 refers to the page management table 121 of the writing target virtual volume to obtain a segment management table 122 of the page from the table #206 corresponding to the write requested page. The writing program 111 refers, for each segment whose pattern ID 210 has been recorded in the segment management table 122, to the specific pattern management table 120 to obtain specific pattern data identified by the pattern ID, and stores the specific pattern data in a storage area of the secured physical area corresponding to the segment. The writing program 111 may record the number of specific pattern data written in the physical area at this time as a specific pattern count number 207 of the page in the page management table 121.

The writing program 111 writes write data in the storage area of the secured physical area corresponding to the writing target segment (Step 807).

Through Steps 805 to 807, the state of the write requested page has been changed from A2 to A1. Accordingly, the writing program 111 changes the state 204 corresponding to the page of the page management table 121 from "1" to "0", records null in the table #206, and discards the segment management table 122 regarding the page (Step 808). Then, the writing program 111 transmits a response to the write command to the host 1 (Step 809) to finish the writing process.

Figure 15:
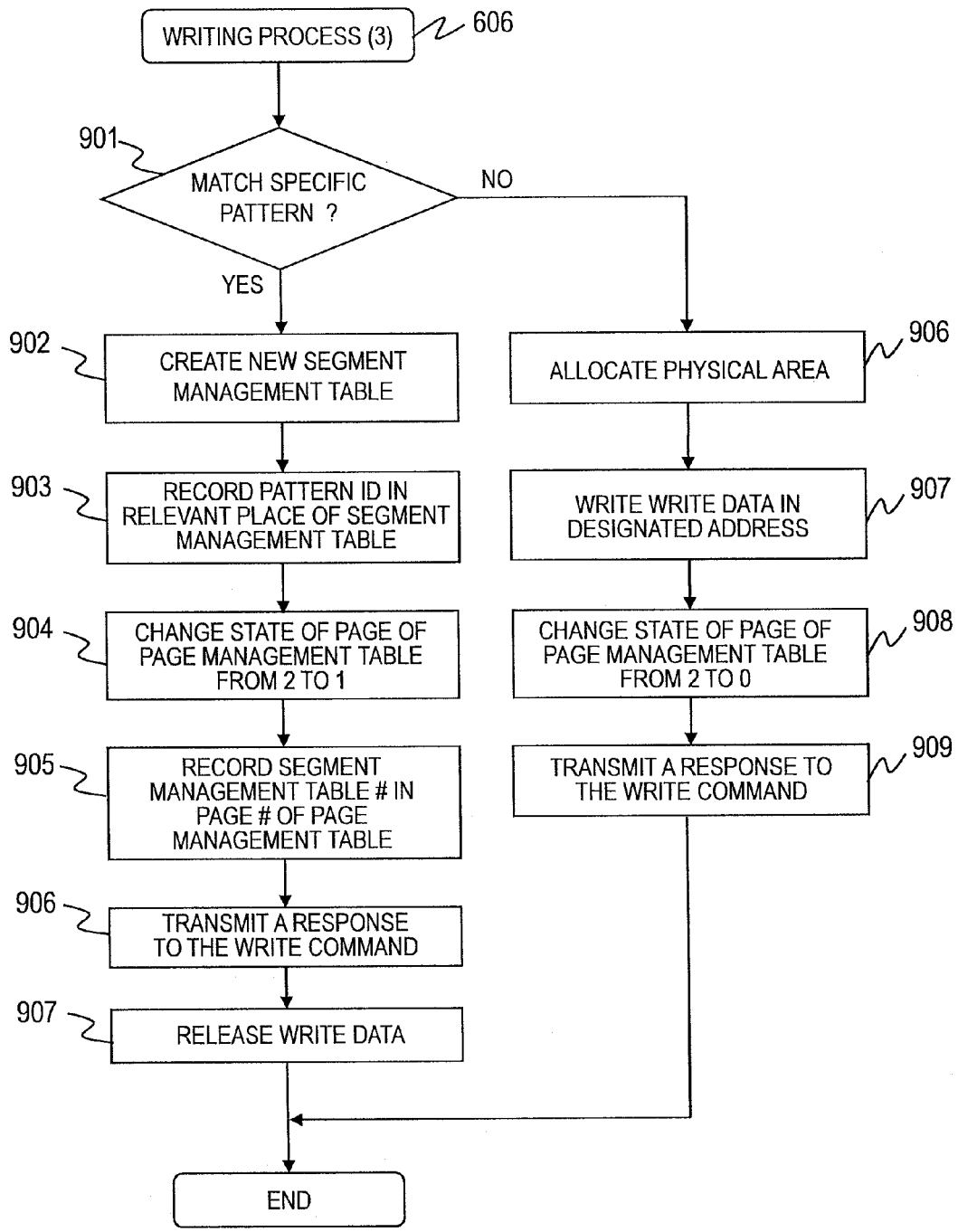
FIG. 15 illustrates an example of a processing flow of a writing process 3.

FIG. 15 illustrates an example of the writing process 3 executed by the writing program 111 when a state of the page of the write request target is A3. The writing program 111 refers to the specific pattern table 120 to judge whether the specific pattern data 1202 include data matched with write data received from the host (Step 901).

If matched data is judged to be present in Step 901, proceeding to Step 902, the writing program 111 creates a new segment table 122 of the page of the write request target (Step 902). The writing program 111 sets "0" in the flag 209 for a writing target segment, refers to the specific pattern management table 120 to specify ID for identifying specific pattern data identical to the write data, and records the specified ID in the pattern ID 210 (Step 903). Through Steps 902 and 903, the state of the writing target page has changed from A3 to A2. Accordingly, the writing program 111 refers to the page management table 121 of the page to change the state 204 of the page from "2" to "1" (Step 904). The writing program 111 records a number for identifying the new segment management table 122 created in Step 902 in the table #206 of the page management table 121 (Step 905). Lastly, the writing program 111 transmits a writing completion response to the host 1 (Step 906), and releases the write data (Step 907) to finish the writing process.

If no matched specific pattern data is judged to be present in Step 901, proceeding to Step 906, the writing program 111 refers, to allocate a physical area from the page pool 103 to the writing target page, to the pool management table 123 to secure a physical area where an allocated flag 1232 indicating an unallocated physical area is "0" (Step 906). A method of securing a physical area is similar to the method of Step 805 of the writing process 2. Then, based on an identification number of a virtual volume contained in the write request and an address of the writing target area, the writing program 111 determines a storage area of the corresponding physical area, and writes the write data in the determined storage area (Step 907). Through Steps 906 and 907, the state of the writing target page has changed from A3 to A1. Accordingly, the writing program 111 refers to the page management table 121 of the page to change the state 204 of the page from "2" to "0" (Step 908). Lastly, the writing program 111 transmits a response to the write command to the host 1 (Step 909) to finish the writing process.

Second Embodiment

This embodiment is directed to a method of reducing the amount of data of a storage subsystem by migrating data stored in a normal volume 104 to a virtual volume 102 to remove duplication of specific pattern data stored in the normal volume 104.

Figure 16:
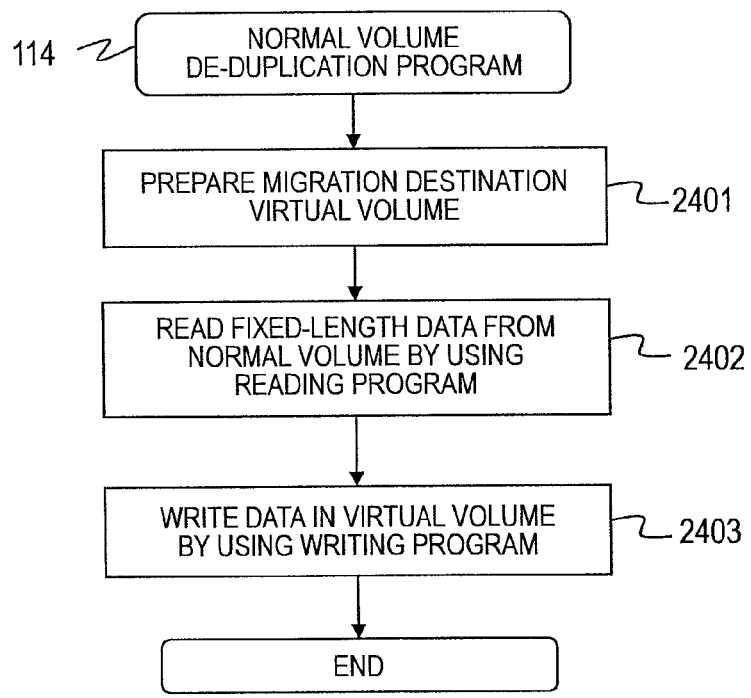
FIG. 16 illustrates an example of a processing flow of a de-duplication program.

FIG. 16 illustrates an example of a flow of the normal volume de-duplication program 114 shown in FIG. 2. First, the normal volume de-duplication program 114 selects a virtual volume 102 having a capacity equal to the capacity of the normal volume 104 as a data migration destination volume (Step 2401). The normal volume de-duplication program 114 may instruct the virtual volume creation program 110 to create a virtual volume 102 of a migration destination. The normal volume de-duplication program 114 sequentially reads data of sizes equal to segment sizes from the normal volume (Step 2402), and writes the read data in the virtual volume 102 by using the writing program 111 described in the first embodiment of this invention (Step 2403).

A method of a writing process is similar to the method of the first embodiment of this invention shown in FIGS. 12 to 15, and thus description thereof will be omitted. The virtual volumes 102 of the data migration destination are classified into pages of states A1 and A2 depending on processes of the writing program 111. A physical area is allocated to the page of the state A1, and data is written in the physical area. However, in the case of the page of the state A2, a de-duplication technology is used, and no physical area is allocated. As a result, a data capacity of the storage system can be reduced.

Thus, according to this invention, even when data in the normal volume 104 is migrated to the virtual volume 102, de-duplication of a high capacity reduction effect is enabled.

Third Embodiment

Figure 17:
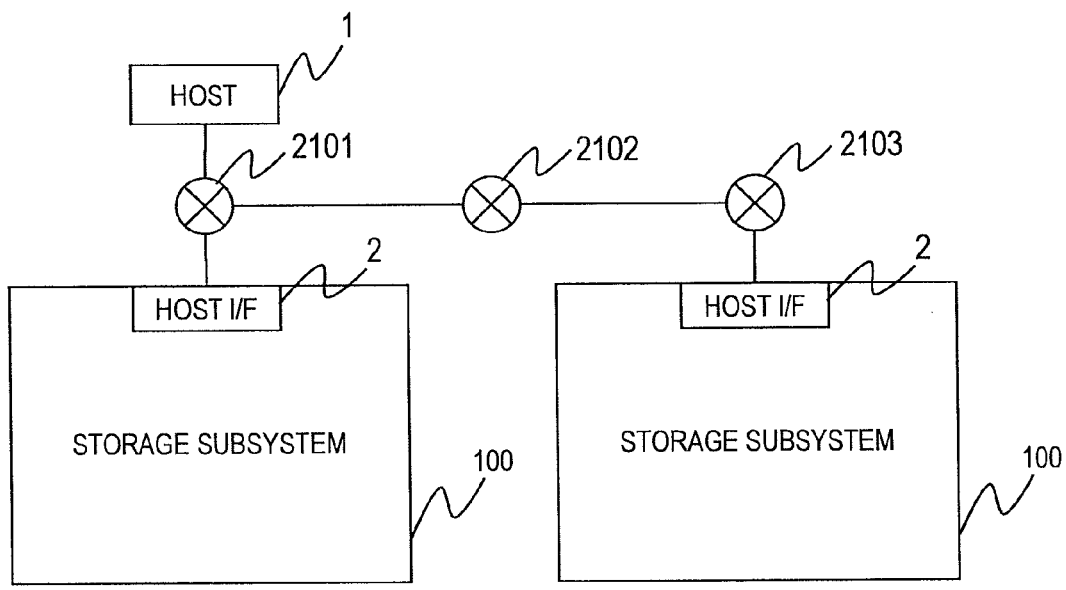
FIG. 17 illustrates an example of a hardware configuration of a storage system according to each of third and fourth embodiments of this invention.

This embodiment of this invention is directed to a method of carrying out, when a plurality of storage subsystems 100 described in the first embodiment of this invention are coupled via networks 2101 to 2103, remote-copying of a high capacity reduction effect among the plurality of storage subsystems as shown in FIG. 17.

A remote copy communication program 118 is used in the remote-copying. A transmission source storage subsystem uses a pattern transmission program 2102 and a data transmission program 2104, and a transmission destination storage subsystem uses a pattern reception program 2103 and a data reception program 2105 to carry out remote-copying among the storage subsystems 100. The programs (2102 to 2105) will be described below in detail. This embodiment will be described by way of the case where data in a normal volume 104 of one storage subsystem is remote-copied to a virtual volume 102 of the another storage subsystem.

In preparation for remote-copying, first, data of specific pattern management tables 120 that transmission source storage subsystem and transmission destination storage subsystem both include are synchronized with each other. For this purpose, the pattern transmission program 2102 and the pattern reception program 2104 are used.

Figure 18A:
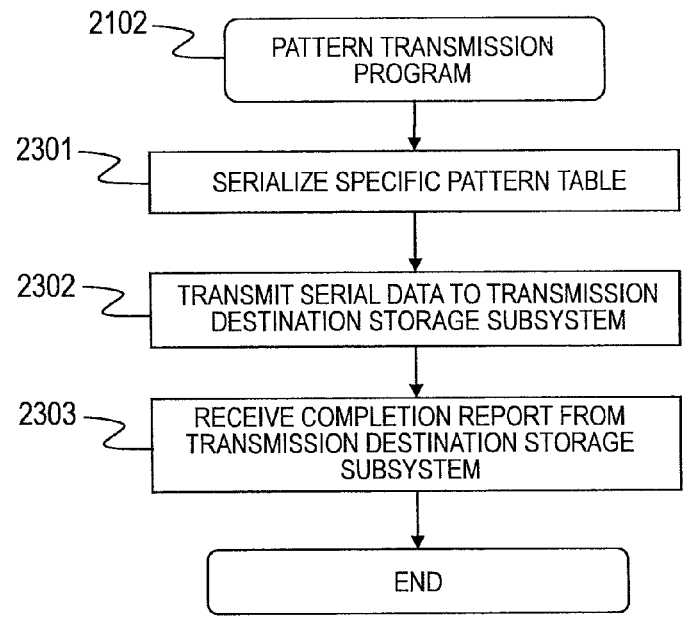
FIG. 18A illustrates an example of a processing flow of a pattern transmission program.

FIG. 18A illustrates an example of a processing flow of the pattern transmission program used by the transmission source storage subsystem. The pattern transmission program 2102 serializes a specific pattern management table 120 of the transmission source storage subsystem (Step 2301). A plurality of serializing methods are available, but detailed description thereof will be omitted in this specification. Serializing means that data processed by software are converted to save the data en bloc in a file or transmit/receive the data via a network. The pattern transmission program 2012 transmits the serial data of the serialized specific pattern management table 120 to the pattern reception program 2014 of the transmission destination storage subsystem (Step 2302). Then, the pattern transmission program 2102 receives a response from the transmission destination storage subsystem to finish the process (Step 2303).

Figure 18B:
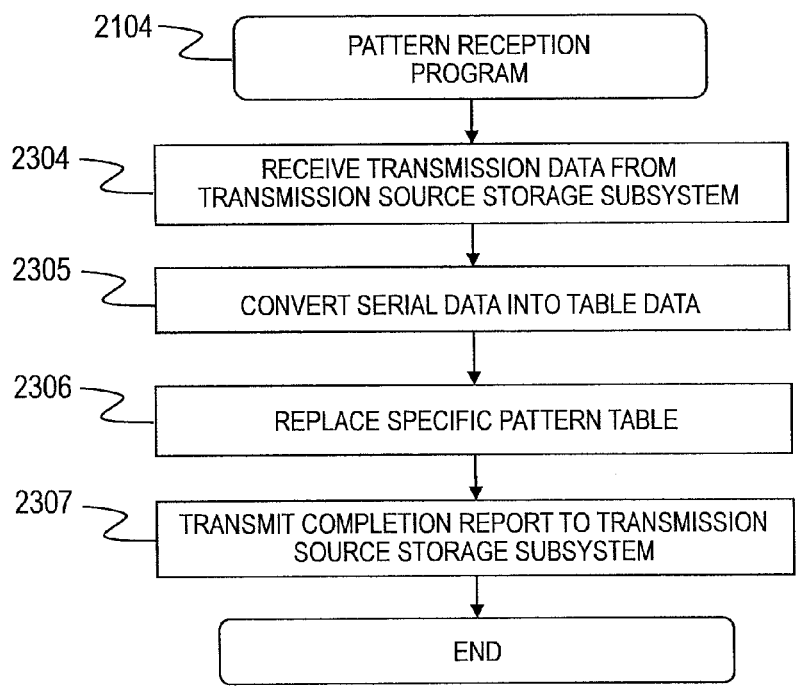
FIG. 18B illustrates an example of a processing flow of a pattern reception program.

FIG. 18B illustrates an example of a processing flow of the pattern reception program used by the transmission destination storage subsystem. The pattern reception program 2104 receives serial data transmitted from the pattern transmission program 2102 (Step 2304) to convert the serial data into data of the specific pattern management table 120 (Step 2305). The pattern reception program 2104 substitutes the specific pattern management table 120 of the transmission destination storage subsystem with the converted data (Step 2306). After completion of the substitution, the pattern reception program 2104 transmits a completion response to the transmission source storage subsystem (Step 2307).

Figure 19:
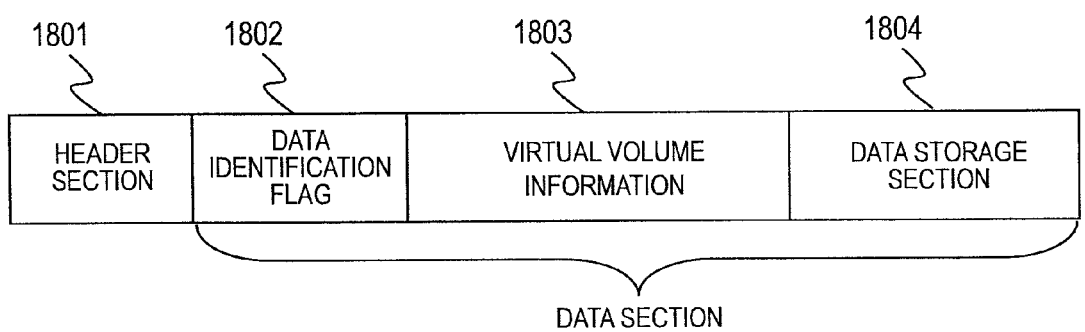
FIG. 19 illustrates a mounting example of a packet transmitted to the storage system.

A data transmission/reception method when remote-copying is carried out among a plurality of storage subsystems will be described. FIG. 19 illustrates an example of a mounting example of a packet transmitted from the transmission source storage subsystem to the transmission destination storage subsystem. The packet includes a header section 1801 for storing address information to specify the transmission destination storage subsystem, and a data section for storing transmission data. The data section includes a data identification flag 1802, virtual volume information 1803, and a data storage section 1804. The data identification flag 1802 indicates whether data transmitted through the packet is real data or pattern ID. According to this embodiment, when the flag is "0", the data storage section 1804 stores real data. On the other hand, when the flag is 1, the data storage section 1804 stores pattern ID. The virtual volume information 1803 contains a number and an address of a virtual volume of the transmission destination storage subsystem in which transmission data is written.

Figure 20A:
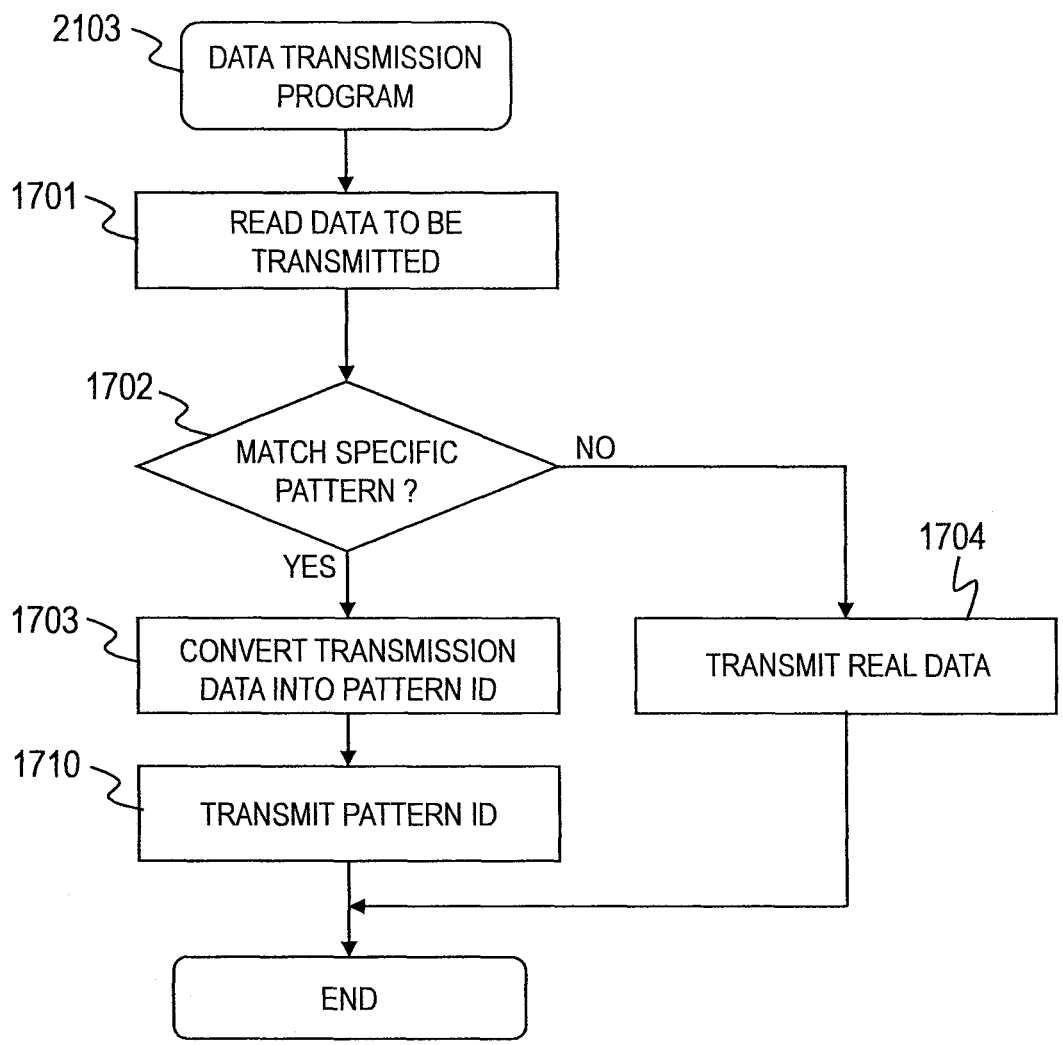
FIG. 20A illustrates an example of a processing flow of a data transmission program.

FIG. 20A illustrates an example of a processing flow of the data transmission program 2103 used by the transmission source storage subsystem. The data transmission program 2103 reads data from a normal volume of the transmission source storage subsystem (hereinafter, referred to as copy source normal volume) which is a copy source of remote-copying (Step 1701). In Step 1702, the data transmission program 2103 refers to the specific pattern management table 120 of the transmission source storage subsystem to judge whether the read data matches specific pattern data. If the read data does not match any one of the specific pattern data, proceeding to Step 1704, the data transmission program 2103 transmits the read data as a packet in its format to the transmission destination storage subsystem. On the other hand, if it is judged in Step 1702 that the data read in Step 1701 matches one of the specific pattern data, the data transmission program 2103 converts the data into pattern ID based on pattern ID 1201 of the specific pattern management table 120 (Step 1703), and transmits the pattern ID to the transmission destination storage subsystem through the packet (Step 1710).

Figure 20B:
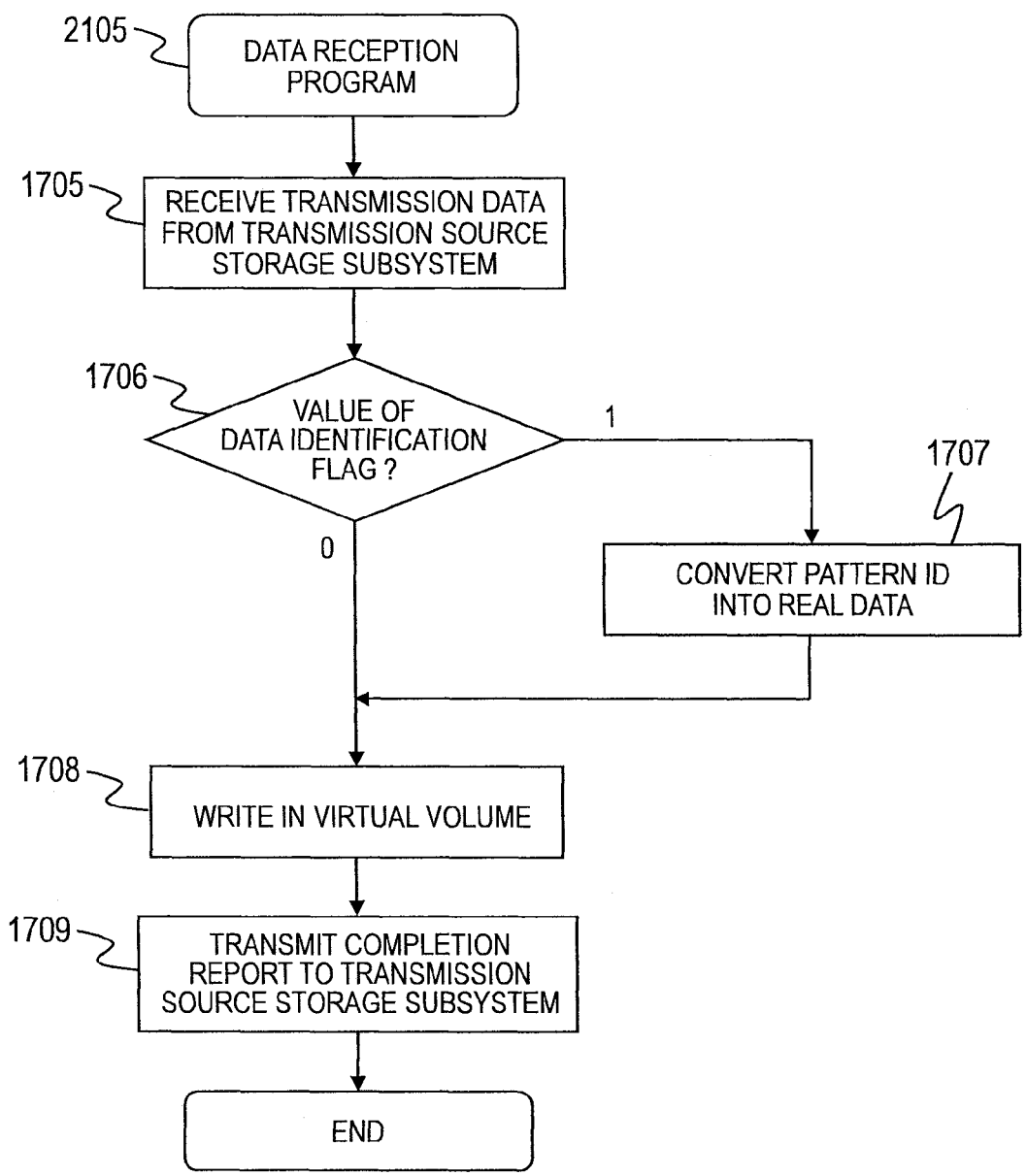
FIG. 20B illustrates an example of a processing flow of a data reception program.

FIG. 20B illustrates an example of a processing flow of the data reception program 2105 used by the transmission destination storage subsystem. Upon reception of a packet from the transmission source storage subsystem (Step 1705), the data reception program 2105 checks a data identification flag 1802 of the packet (Step 1706). If the data identification flag 1802 is "0", proceeding to Step 1708, the data reception program 2105 instructs a writing program 0111 to write real data in a storage area of a virtual volume indicated by virtual volume information 1803 of the received packet. As a result, through the same process as the process described in the first embodiment of this invention referring to FIGS. 12 to 15, data is stored in a copy destination virtual volume which is a remote copy transmission destination by the writing program 111. Upon completion of the writing process, the data reception program 2105 transmits a completion response to the transmission source storage subsystem to finish the process (Step 1709). If the data identification flag 1802 is checked to be "1" in Step 1706, proceeding to Step 1708, the data reception program 2105 refers to the specific pattern management table 120 of the transmission destination storage subsystem to convert pattern ID stored in the data storage section 1804 into real data (Step 1707). Then, the data reception program 2105 executes Steps 1708 and 1709 as described above to finish the process.

According to this method, when data read from the copy source normal volume matches the specific pattern data, not real data but pattern ID is transmitted from the transmission source storage subsystem to the transmission destination storage subsystem. Thus, the copying amount of data necessary for remote-copying can be reduced. In the transmission destination storage subsystem, the copy data is written in the transmission destination virtual volume by using the writing program 111 described in the first embodiment of this invention. Thus, duplication of specific pattern data can be removed. As a result, a necessary storage capacity of the copy destination storage subsystem can be reduced.

The method has been described on the premise that the copy source volume of the transmission source storage subsystem which is a copy source of remote-copying is a normal volume 104. However, the copy source volume may be a virtual volume 102. When the copy source volume is a virtual volume 102, in the transmission source storage subsystem, the copy source virtual volume 102 is managed for each page by using the page management table 121. Accordingly, the transmission source storage subsystem has an understanding about a state of each page. Thus, in the case of a page state A2, even without executing the process of Steps 1701 and 1702 of FIG. 20A, it is obvious that specific pattern data corresponds to the page. Thus, Steps 1701 to 1703 of FIG. 20A can be omitted. In this case, first, the data transmission program 2103 of the transmission source storage subsystem refers to the page management table 121 of the transmission source storage subsystem to judge a state of each page of the copy source virtual volume 102. The data transmission program 2103 proceeds to Step 1702 if a result of the judgment shows that the state is A1, omits Steps 1702 and 1703 to proceed to Step 1710 if the state is A2, and proceeds to Step 1704 if the state is A3. Subsequent Steps in each case are similar to the steps of the case where the copy source is the normal volume.

According to the method, when the data received from the transmission destination storage subsystem is pattern ID (in other words, when a value of the flag is 1 in Step 1706 of FIG. 20B), the pattern ID is first converted into real data (in other words, specific pattern data) (Step 1707 of FIG. 20B), and then the specific pattern data is written in the virtual volume by using the writing program 111. When the writing program 111 writes the specific pattern data in the virtual volume, this specific pattern data is converted again into pattern ID (Steps 801 and 802 of FIG. 14), causing a useless conversion process between the specific pattern data and the pattern ID. In order to prevent this useless process, the writing program 111 may receive pattern ID in place of the write data. In this way, the data reception program 2105 needs only to transmit the pattern ID to the writing program 111 without converting the pattern ID into real data in Step 1707 of FIG. 20B. The writing program 111 that has received the pattern ID understands that writing of predetermined specific pattern data designated by the received pattern ID has been requested to execute a writing process.

The remote-copying carried out through this method enables data transmission/reception where a network communication amount is reduced, and de-duplication of a high capacity reduction effect among a plurality of storage subsystems.

A storage system may also be configured as follows.

In the storage system that includes a transmission source storage subsystem and a transmission destination storage subsystem coupled to the transmission source storage subsystem to communicate, the transmission source storage subsystem and transmission destination storage subsystem include logical storage areas. The transmission source storage subsystem reads data of a remote-copying target from a volume, and transmits, when the read data matches specific pattern data, ID for identifying the specific pattern data to the transmission destination storage subsystem. With this configuration, data transmission/reception with reduced network communication fees can be carried out.

Fourth Embodiment

This embodiment is directed to a method of carrying out data migration of a high capacity reduction effect among a plurality of storage subsystems when the plurality of storage subsystems 100 are coupled via a network as in the case of the configuration shown in FIG. 17.

According to this embodiment, by using a data migration program 113 of a migration source storage subsystem, data of a part or all of normal volumes 104 of the migration source storage subsystem is copied to a virtual volume 102 of a migration destination storage subsystem.

According to this embodiment, first, the migration destination storage subsystem analyzes, by using a specific pattern analysis program 117, data stored in a copy source normal volume 104 of the migration source storage subsystem, and checks which pattern of data should be used as specific pattern data to obtain a high capacity reduction effect. When the specific pattern analysis program 117 is executed as described below, data has to be read from the copy source normal volume to be transmitted to the copy destination storage subsystem before data migration. Thus, execution of the program 117 is not essential. However, if specific pattern data of a high capacity reduction effect can be found in addition to the specific pattern data which has been managed by the migration destination storage subsystem by analyzing the data stored in the copy source normal volume 104 beforehand, efficient de-duplication can be carried out.

Figure 21:
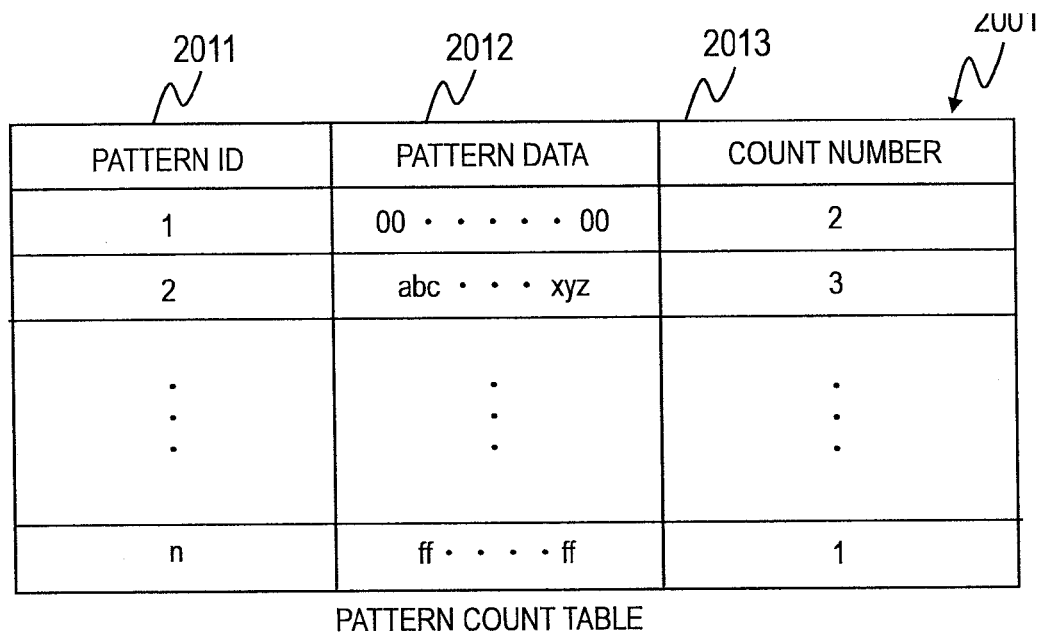
FIG. 21 illustrates an example of a pattern count table.

FIG. 21 illustrates an example of a pattern count table 2001 used by the specific pattern analysis program 117. The pattern count table 2001 is used for registering, when the specific pattern analysis program 117 analyzes the data of the copy source normal volume 104 of the migration source storage subsystem, patterns of the data and the number of appeared patterns. In a pattern ID section 2011, ID added to data read from the copy source normal volume 104 by the specific pattern analysis program 117 is recorded. A data pattern corresponding to each pattern ID is recorded in a pattern data section 2012, and a result of counting identical patterns found in the copy source normal volume 104 of the migration source storage subsystem is recorded in a count number section 2013. By using a hash value or the like for the pattern ID 2011, a capacity of the pattern count table 2001 can be reduced.

Figure 22:
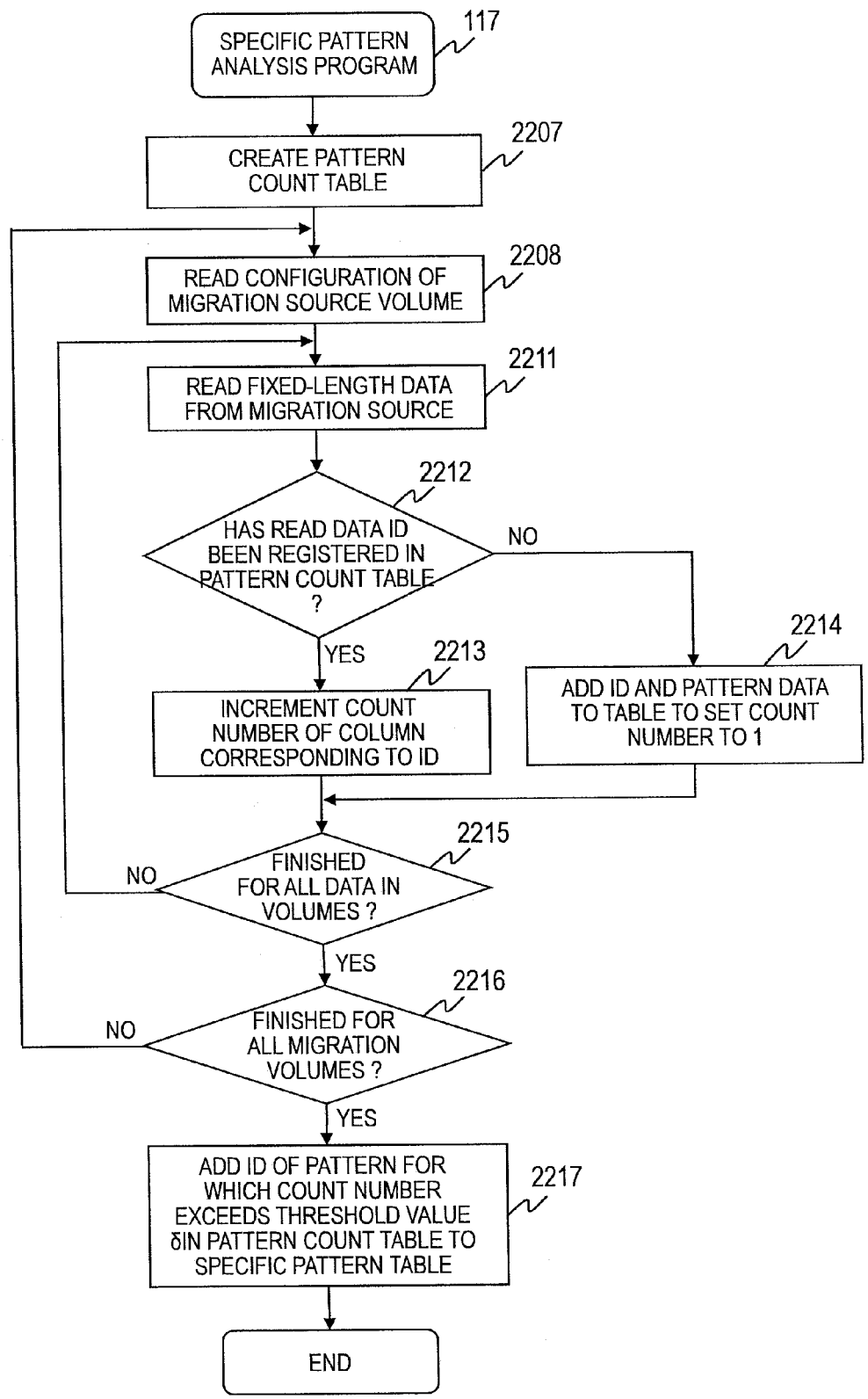
FIG. 22 illustrates an example of a processing flow of a specific pattern analysis program.

FIG. 22 illustrates an example of a processing flow of the specific pattern analysis program 117. First, the specific pattern analysis program 117 creates a pattern count table 2001 (Step 2207). The specific pattern analysis program 117 reads configuration information for each copy source normal volume from the migration source storage subsystem (Step 2208). The configuration information of the copy source normal volume is information regarding a volume size or the like. The following process is carried out for each copy source normal volume. The specific pattern analysis program 117 divides an address space of a migration source volume into segments, and sequentially issues reading requests to the migration source storage subsystem for the segments (Step 2211). The specific pattern analysis program 117 converts data read from the migration source storage subsystem as a result of the specific pattern reading request into data ID. Specifically, the specific pattern analysis program 117 checks whether the read data is present in the pattern count table 2001 (Step 2212), and increments, if the data is present in pattern data 2012 of the pattern count table 2001, a count number 2013 corresponding to the pattern data by 1 (Step 2213). On the other hand, if it is judged in Step 2212 that the read data is not present in the pattern count table 2001, the specific pattern analysis unit 117 allocates new pattern ID to the data, newly adds the data and the pattern ID in the pattern count table 2001, and sets a count number to 1 (Step 2214).

In Step 2208, the specific pattern analysis program 117 judges whether data have been read for all the segments of the copy source normal volume (Step 2215). If data have been read for all the segments, proceeding to Step 2216, the specific pattern analysis program 117 judges whether the process of Steps 2208 to 2215 has been finished for all copy source normal volumes of a data migration target (Step 2216). If finished, the specific pattern analysis program 117 proceeds to Step 2217. On the other hand, if a result of the judgment of Step 2215 shows that data reading has not been finished for all the segments of the copy source normal volume, the specific pattern analysis program 117 repeats Steps 2211 to 2214 for remaining segments until reading of data is completed for all the segments. If a result of the judgment of Step 2216 shows that data reading has not been finished for all the copy source normal volumes of the data migration target, the specific pattern analysis program 117 repeats Steps 2208 to 2215 for remaining copy source normal volumes until data reading is completed for all the copy source normal volumes.

In Step 2217, the specific pattern analysis program 117 analyses which specific pattern data has a high capacity reduction effect by using the pattern count table 2001. A plurality of methods is available for analyzing specific pattern data of high capacity reduction effects. In this specification, a method using a threshold value δ will be described. The threshold value δ is used for judging whether certain pattern data is specific pattern data. In other words, by executing the specific pattern analysis program 117, how many segment data having predetermined patterns present in a predetermined volume are stored is recorded as a count number 2013 in the pattern count table 2001. When the count number exceeds the threshold value δ, the data pattern is authorized as specific pattern to be added to the specific pattern management table 120 of the migration destination storage subsystem. When a threshold value δ is set large, the number of specific patterns to be subjected to de-duplication is small, and a capacity reduction effect is difficult to be obtained. On the other hand, when a threshold value δ is set small, while a capacity reduction effect is easily obtained, the number of specific patterns to be identified increases, thereby increasing the amount of management information.

Upon completion of the specific pattern analysis, the data migration program 113 reads data from the copy source normal volume 104 of the migration source storage subsystem, and writes the data in the virtual volume 102 of the migration destination storage subsystem by using the writing program 111.

Figure 23:
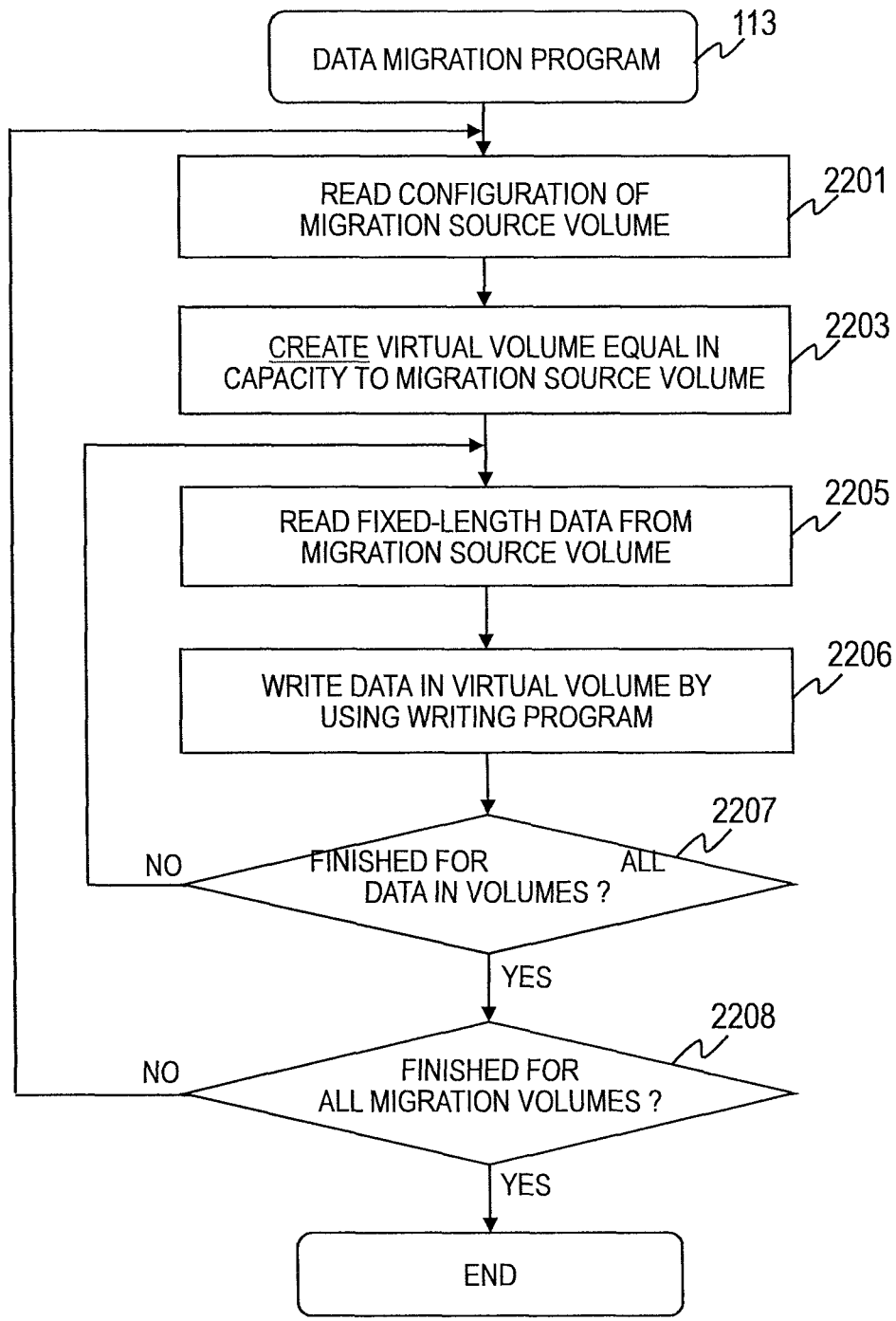
FIG. 23 illustrates an example of a processing flow of a data migration program.

FIG. 23 illustrates an example of a processing flow of the data migration program 113. As in the case of the specific pattern analysis program 117, the data migration program 113 reads configuration information for each copy source normal volume of a data migration target in the migration source storage subsystem (Step 2201), and executes the following process for the copy source normal volume. When the specific pattern analysis program 117 is executed first, Step 2201 may be omitted to use the configuration information read by the specific pattern analysis program 117.

First, the data migration program 113 creates a virtual volume 102 of a size equal to the size of a copy source normal volume (Step 2203) to set the created virtual volume as a data migration destination volume. In order to sequentially read data from a head segment of the migration source normal volume, the data migration program 113 issues a reading request to the migration source storage subsystem (Step 2205). The data migration program 113 instructs the writing program 111 to write data received from the migration source storage subsystem as a result of the reading request in the migration destination volume (Step 2206). As a result, through the same process as the process of the first embodiment of this invention shown in FIGS. 12 to 15, the data is stored in the migration destination virtual volume by the writing program 111. Proceeding to Step 2207, the data migration program 113 judges whether Steps 2205 and 2206 have been finished for all the segments of the copy source normal volume whose configuration information has been read in Step 2201 (Step 2207). If the copy source normal volume includes segments yet to be subjected to the process of Steps 2205 and 2206, the data migration program 113 returns to Step 2205 to repeat Steps 2205 and 2206 until the process is finished for remaining segments. If the process of Steps 2205 and 2206 has been finished for all the segments of the copy source normal volume, the data migration program 113 proceeds to Step 2208. In Step 2208, the data migration program 113 judges whether Steps 2201 to 2207 have been finished for all the copy source normal volumes of a data migration target. If not finished, the data migration program 113 returns to Step 2201 to repeat Steps 2201 to 2207 until the process is finished for remaining copy source normal volumes. If it is judged in Step 2208 that the process of Steps 2201 to 2207 has been finished for all the copy source volumes of the data migration target, the data migration program 113 is finished.

According to this method, in the transmission destination storage subsystem, the data is written in the migration destination virtual volume by using the writing program 111 described in the first embodiment of this invention. Thus, duplication of specific pattern data can be removed, and a necessary storage capacity of the migration destination storage subsystem can be reduced.

If the data migration program 113 is executed after the execution of the specific pattern analysis program 117, the data is read from the copy source normal volume twice in all by both programs to be copied from the migration source storage subsystem to the migration destination storage subsystem, thereby increasing communication loads of the network. In order to prevent this load increase, the data read from the copy source storage subsystem by the specific pattern analysis program 117 in Step 2211 of FIG. 22 may be temporarily stored in the cache memory 5 or the normal volume 104 of the copy destination storage subsystem. Accordingly, the data migration program 113 may use, in place of reading data again from the copy source normal volume of the copy source storage subsystem as described in Step 2205 of FIG. 23, the data stored in the cache memory 5 or the normal volume 104 of the copy destination storage subsystem. As a result, a data transmission amount from the copy source storage subsystem to the copy destination storage subsystem can be reduced.

Fifth Embodiment

This embodiment is directed to a method of more efficiently reducing a capacity of a storage subsystem by, in addition to the de-duplication function described in the first embodiment of this invention, allowing presence of data (also called nonspecific pattern data) in addition to specific pattern data in a page of a state A2, and finely changing the state of the page based on the number of segments of the nonspecific pattern data in the page. Differences from the first embodiment of this invention will mainly be described.

Figure 24:
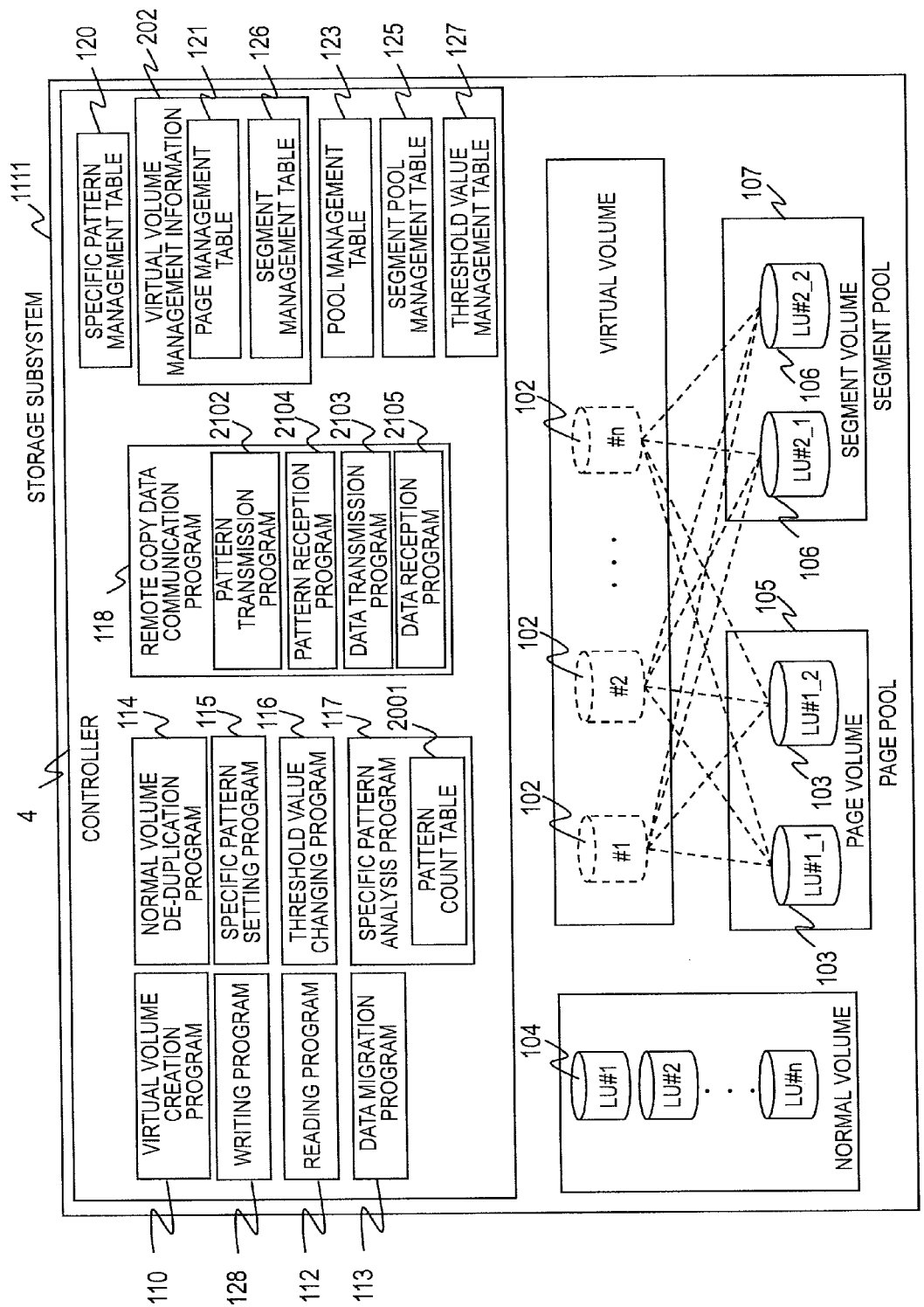
FIG. 24 illustrates an example a logical system configuration of the storage system according to the fifth embodiment of this invention.

FIG. 24 illustrates an example of a logical system configuration of a storage subsystem 1111 according to this embodiment. Different from the case of the first embodiment of this invention, the storage subsystem 1111 shown in FIG. 24 includes a segment pool 107 used for allocating a storage area to store nonspecific pattern data in a page of a state A2. The segment pool 107 includes a plurality of segment volumes 106. As in the case of the normal volume 104 or the page volume 103, the segment volume 106 is a storage area formed in a disk group such as a RAID group which includes a plurality of HDD's 6.

The storage subsystem 1111 of this embodiment further includes, in addition to a pool management table 123 for managing a page pool 105, a segment pool management table 125 for managing the segment pool 107. A configuration of the segment pool management table is not shown because the configuration is similar to the configuration of the pool management table 123 described in the first embodiment of this invention referring to FIG. 5. In the segment pool management table 125, pool LU# is an identification number of a segment volume 106 having a physical area allocated to the segment. A size of each physical area allocated to the segment is equal to the size of the segment. Accordingly, a physical area allocated to a segment identified by an area # is a storage area for a segment size from an address indicated by a start address of the segment volume 106 identified by the pool LU#.

Figures 25, 26:
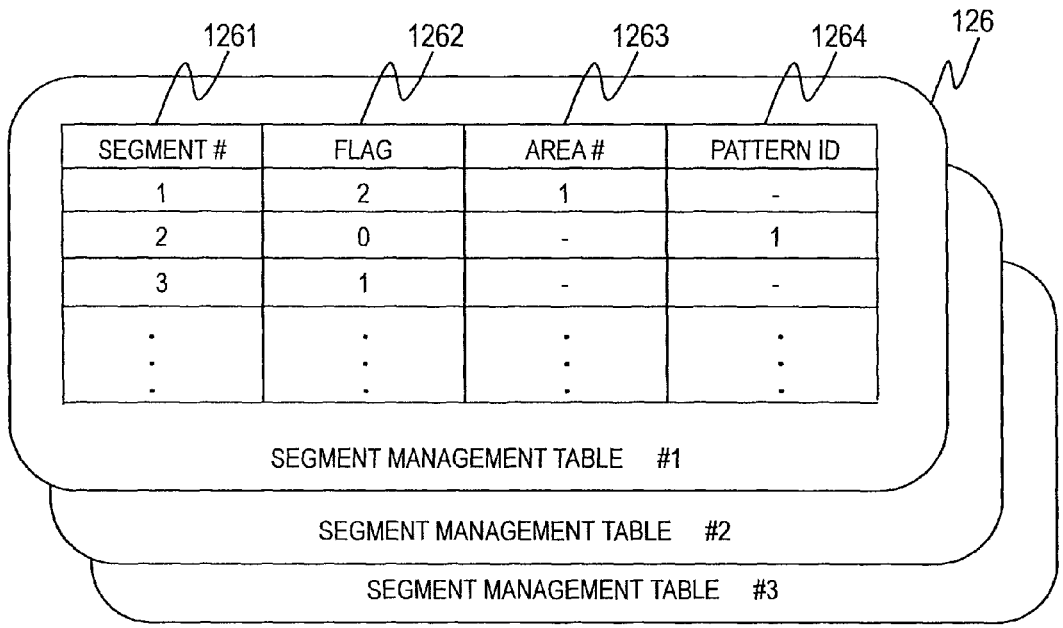
FIG. 25 illustrates an example of a segment management table according to the fifth embodiment of this invention.
FIG. 26 illustrates an example of a threshold value management table according to the fifth embodiment of this invention.

In the storage subsystem 1111 of this embodiment, a segment management table 126 has a configuration different from the configuration of the segment management table 122 of the first embodiment of this invention. FIG. 25 illustrates an example of the segment management table 126 used in this embodiment. In the flag section 209 of the segment management table 122 of the first embodiment of this invention shown in FIG. 4, one of the values "0" indicating the state where writing of specific pattern data has been recorded and "1" indicating the state where no write request in the segment has been received is recorded. In this embodiment, however, in addition to those states, a state "2" where nonspecific pattern data has been stored in a segment may be recorded in a flag section 1262 of the segment management table 126. The segment management table 126 of this embodiment further includes an area number (area #) section 1263. The area # section 1263 is used when "2" has been recorded in the flag section 1262, and records an area number of a physical area of the segment pool 107 allocated to the segment.

A threshold value management table 127 of this embodiment is also different from the threshold value management table 124 of the first embodiment of this invention. FIG. 26 illustrates an example of the threshold value management table 127 of this embodiment. In this embodiment, threshold values $\alpha$ and $\beta$ regarding the number of nonspecific pattern data are used when a page changes in state from A1 to A2 or from A2 to A1. In the case of a page of a state A2, when the number of nonspecific pattern data increases to exceed the threshold value $\alpha$, the state of the page is changed from A2 to A1. In the case of a page of a state A1, when the number of nonspecific pattern data decreases below the threshold value $\beta$, the state of the page is changed from A1 to A2. The threshold values $\alpha$ and $\beta$ can be changed by using a threshold value changing program 116. A processing flow of changing a threshold value is similar to the processing flow of the first embodiment of this invention, and thus description thereof will be omitted. The threshold value $\alpha$ of this embodiment is 2 or more.

A difference of a processing flow of a writing program 128 of this embodiment from the processing flow of the first embodiment of this invention will be described.

Figure 27:
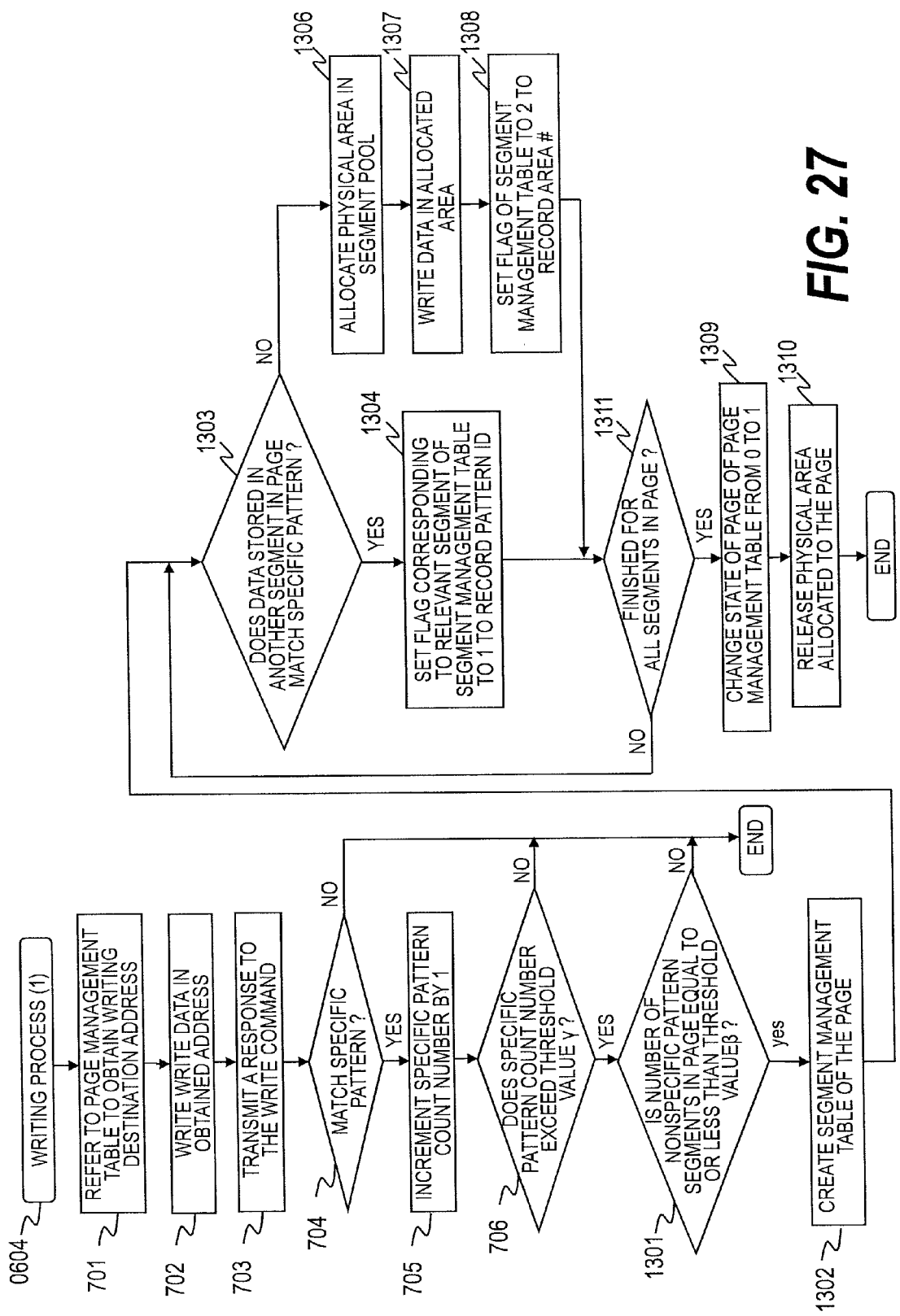
FIG. 27 illustrates an example of a processing flow of a writing process 1 according to the fifth embodiment of this invention.

A writing process 1 executed when a state of a page of a writing target is A1 is different from the writing process 1 of the first embodiment of this invention. FIG. 27 illustrates an example of a processing flow of the writing process 1 of this embodiment. The processing flow is different from the processing flow of the writing process 1 of the first embodiment of this invention in that the step of checking the number of nonspecific pattern data in a page is added to change a page state from A1 to A2.

A description of Steps 701 to 706 is omitted because they are similar to the steps of the first embodiment of this invention. In Step 1301, the writing program 128 checks the number of nonspecific pattern data to judge whether the number is below the threshold value β. The number of nonspecific pattern data may be confirmed by checking all data stored in a writing target page, or by setting a new section to record a nonspecific pattern count number in the page management table to increment, by 1, the count recorded in this section for each writing of nonspecific pattern data.

When the number of nonspecific pattern data drops below the threshold value β, the writing program 128 first creates a segment management table 126 corresponding to the page (Step 1302). Then, the writing program 128 records information of segments in the page in the created segment management table 126 according to the following procedure.

Referring to the specific pattern management table 120, the writing program 128 sequentially reads segment data of the page to judge whether data of a segment matches any one of specific patterns (Step 1303). If the data written in the segment matches one of the specific pattern data, the writing program 128 sets "0" in a flag section 1262 corresponding to the segment, and records corresponding ID in the pattern ID section 1264 (Step 1304). In this case, because the data is not nonspecific pattern data, null is recorded in an area #1263.

If it is judged in Step 1302 that the read segment data does not match any one of the specific patterns, the writing program 128 secures a physical area from the segment pool 107 (Step 1306), and writes the data in the secured area (Step 1307). Then, the writing program 128 records "2" in the flag section 1262 of the segment management table 126, and records the secured area #1263 of the segment pool 107. The data is not specific pattern data, so null is recorded in the pattern ID 1264 (Step 1308).

In Step 1311, the writing program 128 judges whether the process of Steps 1303 to 1308 has been finished for all the segments of the page. If not finished, the writing program 128 returns to Step 1303 to repeat the process for the remaining segments.

Through the aforementioned Steps, the page state has changed from A1 to A2. Accordingly, a state 204 of the page of the page management table 121 is changed from "0" to "1" (Step 1309).

Lastly, the writing program 128 releases the physical area of the page pool 105 allocated to the page (Step 1310).

According to the flow of FIG. 27, even in the case of a page to which a physical area has been allocated, if a state is set where the page includes many pieces of specific pattern data but not many nonspecific patterns, physical areas are allocated only to the nonspecific pattern data. Thus, management of a high capacity reduction effect is enabled.

Figure 28:
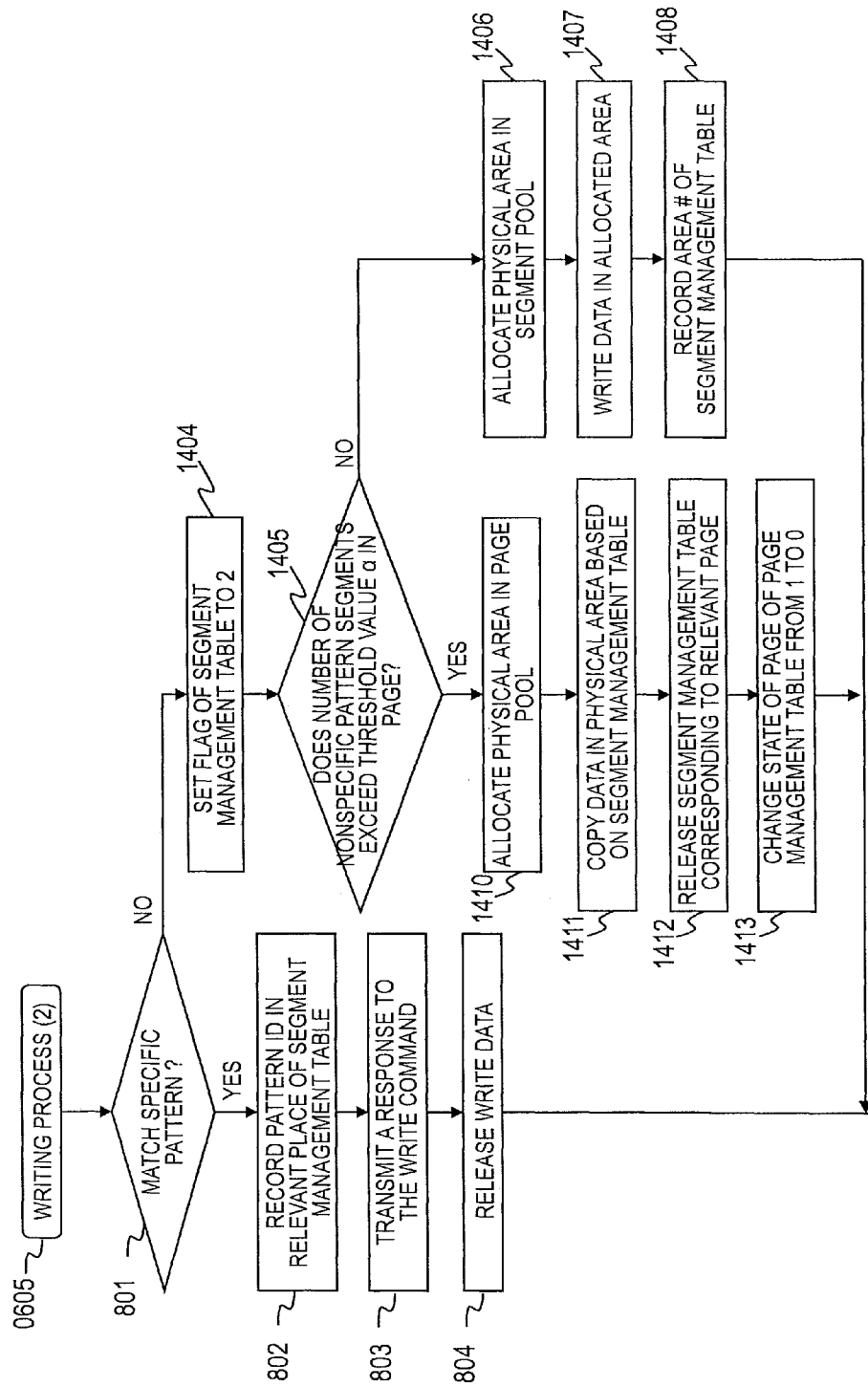
FIG. 28 illustrates an example of a processing flow of a writing process 2 according to the fifth embodiment of this invention.

A writing process 2 of this embodiment executed by the writing program 128 when a state of a writing target page is A2 is also different from the writing process 2 of the first embodiment of this invention. FIG. 28 illustrates an example of a processing flow of the writing process 2 of the embodiment.

A processing flow (Steps 801 to 804) when write data matches one of specific pattern data is similar to the processing flow of the first embodiment of this invention, and thus description thereof will be omitted.

If it is judged in Step 801 that the write data does not match any one of the specific patterns, the writing programs 128 obtains a segment management table 126 for the writing target page to set 2 in a flag section 1262 of a writing target segment (Step 1404). Proceeding to Step 1405, the writing program 128 refers to the flag section 1262 of the segment management table 126 to count the number of segments of flags 2 present in the writing target page. Further, the writing program 128 refers to the threshold value management table 127 to obtain a value of a threshold value α 1272 corresponding to the page, and judges whether the counted number of segments of flags 2 (number of nonspecific pattern data) exceeds the threshold value α (Step 1405). If it is judged in Step 1405 that the number of nonspecific pattern data is below the threshold value α, Steps 1406 to 1408 are carried out. However, Steps 1406 to 1408 are similar to Steps 1306 to 1308 of FIG. 27, so description thereof will be omitted.

If it is judged in Step 1405 that the number of nonspecific pattern data exceeds the threshold value α, the writing program 128 proceeds to Step 1410 to allocate a physical area to the writing target page from the page pool 105 (Step 1410). Then, the writing program 128 refers to the segment management table 126 corresponding to the page, and refers, for a segment whose flag 1262 is "0", to the pattern ID 1264 corresponding to the segment to obtain the pattern management table 121, and stores corresponding specific pattern data in the segment of a secured area. For a segment whose flag 1262 is 1, the writing program 128 stores format data in an area corresponding to the segment of the secured area. If a flag 1262 is 2, the writing program 128 refers to the area #1263 to obtain pool LU #1234 and a start address 1235 corresponding to the segment from the pool management table 123, and copies the data stored in the address in the segment of the secured area (Step 1411). Then, the writing program 128 releases the segment management table 126 corresponding to the page (Step 1412), and changes a state 204 of the page management table 121 corresponding to the page from "1" to "0" to finish the process (Step 1413).

According to the flow of FIG. 28, even when a request of writing nonspecific pattern data in an area to which no physical area has been allocated is received, no physical area is allocated to all the pages where the write request is received while the number of nonspecific pattern data is small, and by allocating physical areas only to the nonspecific pattern data, a storage capacity reduction effect can be heightened.

A processing flow of the writing program 128 when a write request of a page of a state A3 is received is similar to the writing process 3 of the first embodiment of this invention, and thus description thereof will be omitted.

While the present invention has been described in detail and pictorially in the accompanying drawings, the present invention is not limited to such detail but covers various obvious modifications and equivalent arrangements, which fall within the purview of the appended claims.

What is claimed is:

1. A storage subsystem configured to be coupled to a host computer, the storage subsystem comprising:
    a processor;
    a memory;
    a virtual volume; and
    a page volume which includes a plurality of storage media, and which is configured to allocate page physical area of a normal memory to the virtual volume upon receipt of a write request to the virtual volume from the host computer, wherein:
    the processor is configured to:
    divide an address space of the virtual volume into a plurality of pages, and classify each of the plurality of pages into one of a plurality of states including at least a first state, a second state and a third state to manage the address space of the virtual volume;
further divide a page which is classified into the second state into a plurality of segments to manage the page classified into the second state, wherein a page which is classified into the first state is not divided into a plurality of segments to be managed; and
manage a plurality of predetermined pattern data of the memory;
the first state is a state in which, as a result of receiving a request for writing write data in a page, a page physical area is allocated to the page from the page volume, and the write data is stored in the page physical area;
the second state is a state in which, as a result of receiving a request for writing write data matched with predetermined pattern data in a segment of the page, the predetermined pattern data and the segment are managed, in the memory, by correlating with each other; and
the third state is a state in which no page physical area is allocated to a page from the page volume, and the page is not divided into segments to be managed,
wherein the processor is further configured to judge whether the write data matches the predetermined pattern data in the case of which a page designated by an address included in the received write request is in one of the second state and the third state, and
wherein the processor is further configured to:
allocate the page physical area to the page from the page volume in the case of which the page designated by the address included in the write request is in the third state, and the write data does not match the predetermined pattern data;
store the write data in the page physical area; and
manage the page where the write data has been stored as a page of the first state.

2. The storage subsystem according to claim 1, wherein the processor is further configured to store the write data in the page physical area allocated to the page in the case of which a page designated by an address included in the received write request is in the first state.

3. The storage subsystem according to claim 2, wherein the processor is further configured to:
divide the page into the segments to manage correlation each of the divided segments with the predetermined pattern data in the memory in the case of which all pieces of data stored in the page of the first state match the predetermined pattern data;
release the page physical area allocated to the page; and
manage the page from which the physical area has been released as a page of the second state.

4. The storage subsystem according to claim 3, wherein the processor is further configured to:
count the number of pieces of data matched with the predetermined pattern data of the data stored in the page of the first state;
store, in the case of which the write data received according to the write request matches the predetermined pattern data, the write data in the page physical area allocated to the page;
increment the counted number of pieces of data by one; and
judge whether all pieces of data stored in the page match the predetermined pattern data in the case of which the number of pieces of data exceeds a predetermined first threshold.

5. The storage subsystem according to claim 1, wherein the processor is further configured to:
manage the predetermined pattern data with a segment designated by the address in the memory, by correlating in the case of which the page designated by the address included in the write request is in the second status, and the write data matches the specific pattern data; and
discard the write data.

6. The storage subsystem according to claim 1, wherein the processor is further configured to:
allocate the page physical areas to the page designated by the address from the page volume in the case of which the page designated by the address included in the write request is in the second state, and the write data does not match the predetermined pattern data;
store the predetermined pattern data in a physical area corresponding to the segment of the page physical areas allocated to the page based on correspondence between the predetermined pattern data managed in the memory and the segment of the page;
store the write data in a physical area of the page physical areas specified by the address; and
manage the page specified by the address as a page of the first state.

7. The storage subsystem according to claim 1, wherein the processor is further configured to:
divide the page into the segments with correlating the segment designated by the address with the predetermined pattern data to be recorded in the memory in the case of which the page designated by the address included in the write request is in the third state, and the write data matches the predetermined pattern data;
discard the write data; and
manage the page from which the write data has been discarded as a page of the second state.

8. The storage subsystem according to claim 1, further comprising a segment volume which includes a plurality of storage media and has a segment physical area allocated to the virtual volume,
wherein the processor is further configured to:
divide the page into the segments in the case of which the number of pieces of data stored in the page of the first state and matched with the predetermined pattern data exceeds a predetermined first threshold value, and the number of pieces of data stored in the page and not matched with the predetermined pattern data is equal to or less than a predetermined second threshold value;
manage correlation of the segment with the predetermined pattern data in the memory in the case of which the data stored in each of the segments of the page matches with the predetermined pattern data;
allocate the segment physical area to the segment from the segment volume to store the data in the segment physical area in the case of which the data stored in the segment does not match with the predetermined pattern data; and
release the page physical area allocated to the page, and manage the page from which the physical area has been released as a page of the second state.

9. The storage subsystem according to claim 8, wherein the processor is further configured to:
allocate a new segment physical area to the page from the segment volume in the case of which write data received according to a write request which request to write data in the page of the second state does not match with the predetermined pattern data, and the number of pieces of data stored in the page which does not match with the predetermined pattern data is equal to or less than the second threshold value; and
store the write data in the segment physical area.

10. The storage subsystem according to claim 1, further comprising a normal volume which includes a plurality of storage media,
- wherein the processor is further configured to sequentially read data whose size is equal to the segment from the normal volume, and write the read data in the virtual volume in the case of which the data stored in the normal volume is migrated to the virtual volume.

11. The storage subsystem according to claim 1,
- wherein the storage subsystem is coupled to another storage subsystem which has a physical volume including a plurality of storage media, and
- wherein the processor further is configured to:
- sequentially read data from a head segment of the physical volume of the another storage subsystem; and
- write the read data in the virtual volume.

12. The storage subsystem according to claim 11, wherein the storage subsystem is further configured to:
- count the number of pieces of data which is identical with each other among the data read from the physical volume; and
- store the predetermined pattern data in the memory in the case of which the counted number of pieces of data exceeds a predetermined threshold.

* * * * *